United States Patent
Bolze et al.

(10) Patent No.: US 12,456,552 B2
(45) Date of Patent: Oct. 28, 2025

(54) DYNAMIC RISK MANAGEMENT FOR BREAST CANCER WITH MULTI-FACTOR GENETIC TESTING

(71) Applicant: Helix, Inc., San Mateo, CA (US)

(72) Inventors: Alexandre Bolze, San Francisco, CA (US); Joseph J. Grzymski, San Mateo, CA (US)

(73) Assignee: Helix, Inc., San Mateo, CA (US)

( * ) Notice: Subject to any disclaimer, the term of this patent is extended or adjusted under 35 U.S.C. 154(b) by 0 days.

(21) Appl. No.: 18/652,745

(22) Filed: May 1, 2024

(65) Prior Publication Data

US 2024/0387051 A1   Nov. 21, 2024

Related U.S. Application Data

(60) Provisional application No. 63/467,250, filed on May 17, 2023.

(51) Int. Cl.
| | |
|---|---|
| *G16H 50/30* | (2018.01) |
| *G16B 30/00* | (2019.01) |
| *G16B 40/00* | (2019.01) |
| *G16H 10/60* | (2018.01) |

(52) U.S. Cl.
CPC .......... *G16H 50/30* (2018.01); *G16B 30/00* (2019.02); *G16B 40/00* (2019.02); *G16H 10/60* (2018.01)

(58) Field of Classification Search
CPC ........ G16H 50/30; G16H 10/60; G16B 30/00; G16B 40/00
See application file for complete search history.

(56) References Cited

U.S. PATENT DOCUMENTS

| | | | |
|---|---|---|---|
| 2009/0299645 A1* | 12/2009 | Colby | G16B 20/10 |
| | | | 506/7 |
| 2019/0017119 A1* | 1/2019 | Khera | C12Q 1/6886 |

FOREIGN PATENT DOCUMENTS

WO   WO-2020094399 A1 *   5/2020   ........... C12Q 1/6886

OTHER PUBLICATIONS

Tram, Eric; Savas, Sevtap; Ozcelik, Hilmi. "Missense Variants of Uncertain Significance (VUS) Altering the Phosphorylation Patterns of BRCA1and BRCA2." PLoS One 8.5: e62468. Public Library of Science. (May 21, 2013) (Year: 2013).*

* cited by examiner

*Primary Examiner* — Linh Giang Le
(74) *Attorney, Agent, or Firm* — Schwegman Lundberg & Woessner, P.A.

(57) ABSTRACT

Various embodiments disclosed relate to a method of preventive care for breast cancer. A method may include analyzing sequenced genetic data originating from the patient to determine whether the patient has a qualifying variant in any of genes BRCA1, BRCA2, PALB2, ATM, and CHEK2, wherein the qualifying variant can include one or more pathogenic variants, variants of uncertain significance (VUS), or combinations thereof. In an event that the patient does not have a qualifying variant in any of genes BRCA1, BRCA2, PALB2, ATM, and CHEK2, the method can include calculating a polygenic risk score (PRS) of the patient. If the patient has a PRS lower than a predetermined threshold, the method can include classifying the patient as low risk for breast cancer.

20 Claims, 11 Drawing Sheets

FIG. 5

SEQUENCING DATA

| LABORATORY ID | PORTION | SEQUENCE | PATH |
|---|---|---|---|
| 67868339834 | BRCA1 | BAM DATA | ECR/12/3543/4959.BAM |
| 34335093358 | PALB2 | FASTQ DATA | ECR/19/8842/312.FST |
| 43598133691 | ATM | CRAM DATA | ECR/47/7617/545.CRM |
| 87813933178 | CHEK2 | VCF DATA | ECR/03/7894/121.VCF |

FIG. 6

VARIANT DATA

| LABORATORY ID | VARIANT LOCATIONS | LOF? | CODING? | VCF REFERENCE |
|---|---|---|---|---|
| 67868339834 | 7:44,165,965 | YES | NO | VCF141673 |
| 34335093358 | 7:44,146,995-44,147,241 | NO | NO | VCF516548 |
| 43598133691 | 7:44,180,678 | NO | YES | VCF378123 |
| 87813933178 | 7:44,144,224; 7:44,157,951 | YES | YES | VCF227851 |

FIG. 7

EHR DATA

| LABORATORY ID | CODE | VALUE |
|---|---|---|
| 67868339834 | Z80.3 | Exists |
| 34335093358 | Z80.3 | Does Not Exist |

DYNAMIC RISK MANAGEMENT FOR BREAST CANCER WITH MULTI-FACTOR GENETIC TESTING

CROSS-REFERENCE TO RELATED APPLICATION

This application claims the benefit of priority, under 35 U.S.C. Section 119 (e), to U.S. Provisional Application No. 63/467,250, filed May 17, 2023, entitled "DYNAMIC RISK MANAGEMENT FOR BREAST CANCER BASED ON MULTI-FACTOR GENETIC TESTING," which is incorporated herein by reference in its entirety.

TECHNICAL FIELD

The disclosure relates to the field of genomic analysis, and in particular, to treatment of patients based on multi-factor genetic risk.

BACKGROUND

Breast cancer is one of the most prevalent cancers in women in the United States, comprising almost one third of newly detected cancers among women. Because breast cancer results in a significant risk of mortality, efforts are underway to ensure that it can be detected early. Certain factors, such as the presence of a harmful variant in the genes BRCA1 and BRCA2, are known to substantially increase risk. However, not all women who develop breast cancer have these harmful variants, and not all women with these harmful variants develop breast cancer.

Current medical efforts are focused on self-reporting of family history relating to breast cancer. However, family history of breast cancer is often only reported after diagnosis of breast cancer, rather than before. This makes it untenable for health care providers to rely on family history to drive screening for breast cancer.

Measures taken for preventive care related to breast cancer vary widely. Lesser screening may comprise adjusting a frequency at which mammograms are performed. Other measures, such as lumpectomy and mastectomy, involve surgery. It is helpful for patients to have an understanding of risk before selecting a regimen of care. Accurate understanding of risk on a population scale is also important, because one in eight women in the United States are expected to develop breast cancer in their lifetime. This means that any imprecision in understanding breast cancer risk will cause a substantial number of medical resources to be either underutilized or wasted, negatively impacting health outcomes across the nation.

SUMMARY OF THE DISCLOSURE

In some aspects, the techniques described herein relate to a method of determining breast cancer risk level for a patient, the method including: analyzing sequenced genetic data originating from the patient to determine whether the patient has a qualifying variant in any of genes BRCA1, BRCA2, PALB2, ATM, and CHEK2, wherein the qualifying variant can include one or more pathogenic variants, variants of uncertain significance (VUS), or combinations thereof; and in an event that the patient does not have a qualifying variant in any of genes BRCA1, BRCA2, PALB2, ATM, and CHEK2, calculating a polygenic risk score (PRS) of the patient; and if the patient has a PRS lower than a predetermined threshold, classifying the patient as low risk for breast cancer.

In some aspects, the techniques described herein relate to a method of determining breast cancer risk level for a patient, the method including: receiving health data indicating whether a patient that is female has a family history of breast cancer; obtaining or having obtained a biological sample from the patient; performing or having performed sequencing on the biological sample to acquire genetic data for the patient; analyzing the genetic data to determine whether the patient has a qualifying variant in any of genes ATM or CHEK2; and in an event that the patient has a qualifying variant in any of genes ATM or CHEK2: calculating a Polygenic Risk Score (PRS) for the patient; if the patient has a PRS higher than a first threshold, referring the patient for preventive measures pertaining to breast cancer.

In some aspects, the techniques described herein relate to a method of determining breast cancer risk level for a patient, the method including: receiving health data indicating whether a patient that is female has a family history of breast cancer; obtaining or having obtained a biological sample from the patient; performing or having performed sequencing on the biological sample to acquire genetic data for the patient; analyzing the genetic data to determine whether, regardless of family history, the patient has a qualifying variant in any of genes BRCA1, BRCA2, PALB2, ATM, or CHEK2; and in an event that the patient has a qualifying variant in any of genes BRCA1, BRCA2, PALB2, ATM, or CHEK2: referring the patient for preventive measures pertaining to breast cancer.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 is a table that summarizes sequence data for individuals in an illustrative embodiment.

FIG. 6 is a table that summarizes variant data for patients in an illustrative embodiment.

FIG. 7 is a table depicting Electronic Health Record (EHR) data in an illustrative embodiment.

DETAILED DESCRIPTION

Figure 1:
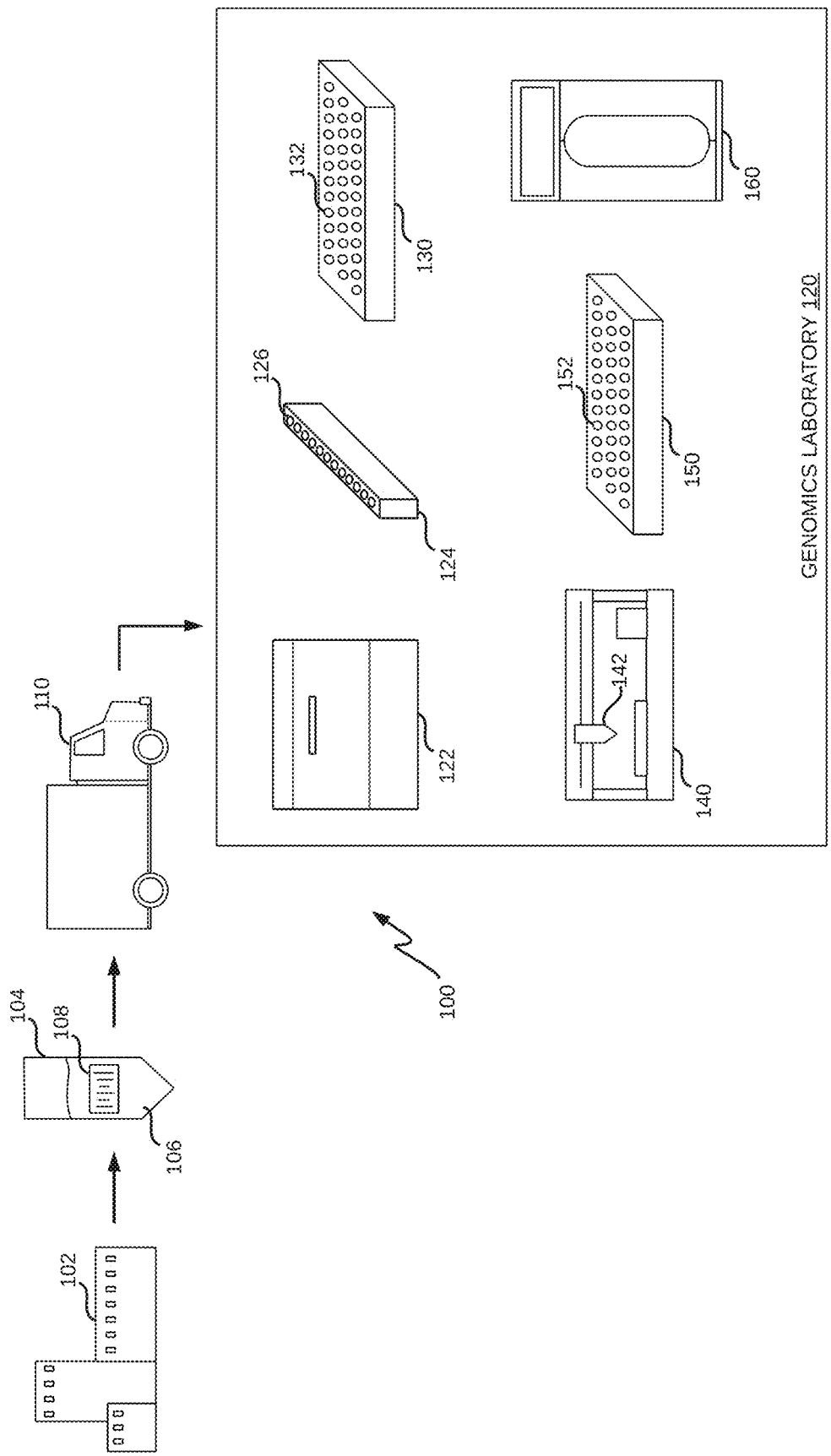
FIG. 1 is a diagram depicting a sample processing architecture in an illustrative embodiment.

Methods and systems described herein beneficially provide a heuristic for controlling preventive care and/or screening for breast cancer, based on results of a multi-factor genetic test. This beneficially provides guidance to health care providers and patients who may otherwise be uncertain of how to engage in, or whether to engage in, preventive care and screening for breast cancer. Furthermore, because these processes are scalable for large populations (e.g., millions of people), they have the potential to greatly reduce both waste and underutilization of medical resources.

Disparities can be common in breast cancer screening and treatment. For example, some clinical risk assessments, aimed at identifying women eligible for referral to high-risk breast cancer clinics, are inconsistently applied, leading to inequitable outcomes. Consistent implementation of screening and precise capture of family history data by all providers remains a first step in assessing who should receive counseling and genetic testing. An alternative or additional approach to identifying individuals who may benefit from referral to a high-risk clinic is to adopt a population-level genetic screening approach.

For example, the detection of rare, high-impact variants, such as loss-of-function variants in BRCA1 and BRCA2, can be used to identify individuals who should undergo mammography screening at an earlier age and with greater frequency, have breast MRIs, and should consider risk-reducing measures. Variants in other genes, including PALB2, ATM, and CHEK2, are also strongly associated with breast cancer. Moreover, polygenic risk scores (PRS), based on common variants associated with breast cancer, can be developed across cohorts.

The methods and systems discussed herein incorporate and combine genomic screening methods for identifying women at high risk of breast cancer and prospectively assess the impact of these methods when applied in a clinical setting. These methods leverage family history as a tool for identifying women at high risk of breast cancer in combinations with analysis of pathogenic variants in BRCA1, BRCA2, PALB2, ATM, and CHEK2, and the presence of a high polygenic risk, in breast cancer diagnosis.

Such methods can allow for earlier screening and classification of patients as high risk, average risk, or lower risk for breast cancer. As discussed herein, "high risk" for breast cancer is a 20% or greater risk of breast cancer by age 70. While guidelines currently exist for identifying high risk patient, guidelines are not currently in use to identify low risk patients. For example, high risk patients can be identified by the presence of a pathogenic variant (P variant) of BRCA1 or BRCA2 genes.

Discussed herein, low risk patient can also be identified, such as by the absence of P variants and variants of uncertain significance (VUS) in breast cancer genes including BRCA1, BRCA2, in addition to PALB2, ATM, and CHEK2 in addition to a low PRS (e.g., bottom 10%) under a validated 313-single-nucleotide variant (SNV) model. It may be highly beneficial to distinguish low risk patients from average risk patients, as in some embodiments, only low risk patients qualify for reduced screening.

One problem solved by the methods and systems discussed herein is the desire for a more precise and personalized approach to breast cancer risk assessment and management. Traditional methods can rely heavily on self-reported family history, which can be incomplete or inaccurate, and do not account for the complex interplay of multiple genetic factors beyond the well-known BRCA1 and BRCA2 gene mutations. This can lead to both over- and under-screening, resulting in unnecessary procedures for some and missed early detection opportunities for others.

The methods and systems discussed herein address these issues in several ways. First, they allow for improved risk stratification by analyzing a broader range of genetic factors, including multiple genes and polygenic risk scores. Thus, the systems provide a more nuanced risk stratification than methods based solely on family history or single-gene analysis. They also allow for personalized preventive care: the systems' ability to integrate genetic data with electronic health records allows for personalized recommendations for preventive care and screening, tailored to the individual's specific risk profile.

The methods and systems discussed herein further allow for optimization of resource utilization; by identifying individuals at higher risk who may benefit from more intensive screening and those at lower risk who may require less, the system helps to optimize the allocation of medical resources. For example, if a number of women are categorized as "low risk", and can defer regular mammogram screening, this frees up some of the burden on the medical system. This could be particularly beneficial if "high risk" patients begin such screening earlier than historically done.

Moreover, this can help reduce psychological and physical burdens. For patients identified as lower risk, the system can reduce the psychological stress and physical burden associated with unnecessary screening and interventions. Early detection can also be enhanced. For high-risk individuals, the system facilitates early detection strategies that can lead to earlier intervention and potentially better outcomes.

Overall, the methods and systems here help address the challenges of how to effectively and efficiently manage breast cancer risk in a way that is tailored to the genetic and personal health profile of individual patients, thereby improving the quality of care and potentially saving lives.

Systems for Genetic Analysis

FIG. 1 is a diagram depicting a sample processing architecture 100 in an illustrative embodiment. Sample processing architecture 100 comprises any system or organizational structure for acquiring and sequencing biological samples in a high-volume, high-throughput manner. Sample processing architecture 100 may be utilized, for example, to collect and sequence genetic material (in the form of Ribonucleic Acid (RNA) or Deoxyribonucleic Acid (DNA)) found within thousands or tens of thousands of samples 106 daily, via multiple healthcare provider networks 102.

Healthcare provider networks 102 may comprise hospitals, clinics, practitioner offices, laboratories, surgical centers, etc. that engage in or facilitate the practice of medicine. In one embodiment, healthcare provider networks 102 each comprise groups of hospitals that treat millions of patients. As a part of the practice of medicine, healthcare provider networks 102 acquire samples 106 for sequencing. For example, a healthcare provider network 102 may acquire samples 106 as part of a population screening program, as part of medical treatment, etc. The specific amount of sequencing desired for a sample 106 may comprise a selected set of one or more genes, an exome, the entire genome of a patient, etc. The samples 106 are stored in sample containers 104, which may be accompanied by Customer Sample Identifiers (CSIs) 108. A delivery service 110 provides the samples 106 to a genomics laboratory 120 for processing.

Procedures within genomics laboratory 120 related to genetics may include accessioning, sample plating, storage, extraction, library preparation, enrichment, and sequencing processes. These processes acquire genetic material from a sample 106, separate the genetic material from other constituents, duplicate the genetic material, and quantify the genetic material order to determine a swathe of sequence data, such as an exome or entire genome for a subject (e.g., a human patient, an organelle of a human patient, etc.). Although the procedures discussed herein are specific with regard to one method of sequencing, other techniques may be utilized in accordance with known standards in order to perform sequencing for samples 106. For example, although the techniques discussed herein relate to hybridization capture techniques, amplicon-based techniques may be used.

Accessioning. Accessioning refers to receiving and preparing samples 106 for later laboratory processes. In one embodiment, accessioning includes receiving a batch of samples 106 (e.g., hundreds or thousands of samples 106) from one or more delivery services 110 each day for processing. For example, packages that each include tens or hundreds of samples 106 may be delivered to genomics laboratory 120 via the United States Postal Service (USPS), or a private package carrier.

Each sample 106 may be retained within a sample container 104, such as a five milliliter (mL) test tube. In this embodiment, the sample container 104 is sealed to prevent the sample 106 from being exposed to the environment and also to prevent the sample 106 from co-mingling with other samples 106. For example, the sample 106 may be sealed via a cap that is threaded, glued, press-fit, etc. At the time of delivery, the sample container 104 may further include a remnant of a sampling tool, such as a portion of a swab that was utilized to acquire the sample.

In many embodiments, a CSI 108 for the sample 106 is reported via a component affixed to or integrated with the sample container 104. The CSI 108 uniquely distinguishes the sample 106 from other samples 106 being received. For example, a CSI 108 may uniquely distinguish a sample 106 from other samples 106 in the same batch, other samples 106 received on the same date, other samples 106 received from the same healthcare provider network 102, etc. A CSI 108 may be reported via a barcode label, Quick Response (QR) code label, Radio Frequency Identifier (RFID) chip, or any suitable visual, transmission-generating, or other physical component affixed to or integrated with the sample container 104.

In further embodiments, the sample container 104 is itself sealed within an external container such as a bag (not shown). Using an external container helps to prevent contamination, by ensuring that a technician at the genomics laboratory 120 does not contact biological material from the sample 106 that may exist on an outer surface of the sample container 104. Use of an external container may also be required by law (e.g., Department of Transportation (DOT) guidelines). Use of an external container additionally helps to prevent cross-contamination between samples 106. Furthermore, in embodiments where samples 106 may include blood or a pathogen, an external container provides an additional barrier to protect the health of technicians. The external container may additionally include documentation confirming the CSI 108, information for the subject that the sample was sourced from, and/or information indicating circumstances of sampling. The circumstances of sampling may include, for example, a sampling date, a sampling method, a location that the sample was acquired, a name or title for a person who performed the sampling, and/or additional notes.

In this embodiment, the sample 106 comprises a chemical solution. For example, the sample 106 may comprise a prepared aqueous solution such as a saline solution, or may comprise a bodily fluid such as blood, saliva, mucus, etc. In some embodiments each of the samples 106 fills between two and five milliliters of volume within its corresponding sample container 104.

The samples 106 further include genetic material such as Deoxyribonucleic Acid (DNA), Ribonucleic Acid (RNA), etc. In many instances, the genetic material is one of many constituent components within the sample 106. For example, the genetic material may exist within the nuclei of white blood cells that are included within the sample 106. In a further example, genetic material may exist within viruses or bacteria within the sample 106. In this embodiment, the genetic material is not yet isolated from the remaining constituent components of the sample 106.

After receipt of the samples 106, batches of the samples 106 (e.g., as stored within sample containers 104 and/or external containers) may be heated in ovens 122 to facilitate cell lysis. The temperature, and duration of heating, may be chosen such that pathogenic material within the samples 106 is rendered harmless, or such that cellular lysis occurs. For example, heating may occur at a temperature of between forty and eighty (e.g., fifty) degrees Celsius (C), for a period of time between fifteen and two hundred (e.g., thirty) minutes. In some embodiments, including embodiments wherein the samples 106 are primarily the contents of a blood draw, the heating step may be foregone.

In this embodiment, upon completion of heating, the batches of samples 106 are removed from the ovens 122. In one embodiment, sample containers 104 are removed from corresponding external containers, such as by cutting the external containers open. With the sample containers 104 now available for direct interaction, the sample containers 104 are inspected. As a part of this process, a technician or automated system may determine the CSI 108 for the sample 106 and may compare the CSI 108 to a CSI 108 listed on documentation provided in the external container. If there is a discrepancy between the CSI 108 on the sample container 104 and a CSI 108 listed in the documentation, the sample 106 may be flagged as having an error condition. Similarly, if the CSI 108 on the sample container 104 is damaged (e.g., abraded, heat-damaged, or water-damaged) and has become unreadable, the sample 106 may be flagged as having an error condition.

A technician or automated system may further inspect the contents of the sample container 104, via visual or other methods. If the sample 106 does not include expected constituent component (or is otherwise non-compliant) then the sample 106 is flagged as having an error condition. For example, if the sample 106 is primarily saliva and includes a fluid that is not permitted (e.g., blood), includes an entire swab or no swab, appears to have a fractured or broken casing, or is outside of an expected range of volume (e.g., between two and five milliliters), then the sample 106 may be flagged as having an error condition.

Samples 106 that have not been flagged as having an error condition proceed to sample integration. In one embodiment, as a part of sample integration, the sample 106 is assigned a Laboratory Sample Identifier (LSI). The LSI identifies the sample 106 from other samples 106 received for the batch, received on the same day, processed in the same laboratory, and/or handled by the same organization performing sequencing. In many embodiments, the LSI is stored in a memory of a genomics server (e.g., within a laboratory sample database), and is associated with a corresponding CSI 108 for the sample. The LSI may also be associated with any error conditions reported for the sample 106.

In many embodiments, CSIs 108 originally provided with the samples 106 are in the form of a paper barcode. In such embodiments, the paper barcode may be printed in aqueous ink. This renders the barcode subject to degradation upon exposure to liquid in the laboratory environment, which is undesirable.

To ensure that each sample container 104 is capable of traveling through the genomics laboratory 120 without its identifier being physically degraded, a corresponding LSI may be indicated at the sample container 104. The LSI may be indicated via the application of a barcode label, Quick Response (QR) code, Radio Frequency Identifier (RFID) chip, or other visual, transmission-generating, or another physical component affixed to or integrated with the sample container.

In one embodiment, the LSI is printed onto a barcode label comprising rip-proof material (e.g., vinyl) in a water-insoluble ink. This implementation ensures that the barcode label is resistant to physical and chemical degradation. The barcode may be applied around a perimeter of the sample container 104, ensuring that the sample container 104 may be scanned from any angle.

In further embodiments, the element used to report the LSI is accompanied by a visually distinct mark that enables rapid confirmation by a technician that the sample 106 has been integrated into the laboratory environment. The visually distinct mark may comprise a colored ring (e.g., around an entire perimeter of the sample container), a logo, a physical feature, a stamp, etc.

Sample Plating. With the samples 106 having been successfully integrated into the environment of the genomics laboratory 120 environment, the samples 106 are ready for analytics to be performed. To this end, the samples 106 are prepared for transfer to a sample microplate 130. The sample microplate 130 may be labeled with a unique identifier via similar techniques to those used for sample containers 104 above. The unique identifier distinguishes the sample microplate 130 from other sample microplates 130. In one embodiment, the sample microplate 130 comprises a solid body defining three hundred and eighty-four wells, distributed across sixteen rows and twenty-four columns, each well having a capacity of between thirty and one hundred microliters. In a further embodiment, the sample microplate 130 comprises a solid body defining ninety-six wells, distributed across eight rows and twelve columns, each well having a capacity of between one hundred and three hundred microliters. Any suitable number and arrangement of wells may be selected as a matter of design choice.

As a part of preparing the samples 106 for transfer to the sample microplate 130, a technician may place sample containers 104 onto a rack 124 and scan each sample container 104 to determine an LSI for each location 126 (e.g., each container receptacle) on the rack 124. In some embodiments, the rack 124 is assigned a unique identifier that distinguishes it from other racks 124. The rack 124 may be labeled with a unique identifier using techniques similar to those used for sample containers 104. The technician, or automated machinery such as a server operating an optical scanner, may then associate the unique identifier for the rack 124, along with the locations 126 assigned to the samples 106, with the corresponding LSIs of the samples 106 stored at the rack 124.

The technician additionally unseals the sample containers 104. Unsealing of sample containers 104 may be a deeply labor-intensive process, particularly when laboratory processes are performed at scale to handle tens of thousands of samples 106 per day. Thus, a technician may utilize automated tooling to enhance the speed at which sample containers 104 are unsealed. The tooling may, for example, unscrew, cut, or drill each sample container 104, in order to make the sample 106 within available for physical transfer to the sample microplate 130.

One or more racks 124 of samples 106 are provided to a Liquid Handler (LH) 140, such as an automated robot that operates an end effector 142 in accordance with one or more Numerical Control (NC) programs to transfer liquids between wells via arrays of micropipettes. An LH 140 is also known as a "Liquid Handling System." LH 140 may comprise, for example, a Hamilton Microlab Star Liquid Handling System.

In this embodiment, the LH 140 proceeds to transfer a portion of each sample 106 at a rack 124 to a well 132 within the sample microplate 130 that is not shared with other samples 106. For example, the well 132 for each sample 106 may be predetermined in accordance with a control program used by the genomics laboratory 120. In one embodiment, the LH 140 transfers the portions of the samples 106 to the wells 132 of the sample microplate 130 by providing instructions to actuators, piezoelectric elements, and/or pressure systems operating the end effector 142. In such an embodiment, the end effector 142 may align its array of micropipettes with the sample containers 104 to retrieve portions of the samples 106. Furthermore, in such an embodiment, the end effector 142 may dynamically align its array of micropipettes with the sample microplate 130 to deposit the portions of the samples 106 at the wells 132.

Because there is a known relationship between locations 126 at the rack 124 and wells 132 of the sample microplate 130 (e.g., as indicated by row and column), contents of the memory of a genomics server (e.g., a laboratory sample database) may be updated to indicate the well 132 storing genetic material for each sample 106. In one embodiment, the memory is further updated to associate a unique identifier for the sample microplate 130 with the samples 106 stored therein.

In one embodiment, programmed instructions for the LH 140 may direct the end effector 142 to position itself above a set of disposable tips, descend into the tips to attach the tips, reposition the end effector 142 above the rack of sample containers 104, adjust spacing between micropipettes within the array, descend until the tips reach the sample containers 104, draw liquid from the sample containers 104, deposit the liquid into a well at the sample microplate 130, and then dispose of the tips. Such a process may be repeated across sample containers 104 stored on multiple racks until the sample microplate 130 is filled with portions from the samples 106. In one embodiment, one or more wells 132 on the sample microplate 130 are filled with a control reagent instead of a portion of a sample 106.

The amount of liquid drawn from each sample container 104 may comprise a small fraction of the overall volume of the sample container 104. For example, an amount of liquid drawn may comprise several microliters, such as between two and ten microliters. Upon completion of transfer from the sample containers 104 to the wells, the sample microplate 130 may be covered with a liquid and/or gas-impermeable layer, such as foil or paraffin. Sample containers 104 remaining on the racks may be resealed, for example with pressure-fit caps having a color distinct from an original color for the sample containers. With accessioning now complete for the sample microplate 130, the sample microplate 130 is transferred to a next section of the laboratory for processing.

Storage. In one embodiment, accessioned samples 106, samples 106 ready for analytics, and/or samples 106 that have already been sequenced, are stored for later use. For example, samples 106, sample containers 104, and/or sample microplates 130 may be stored at room temperature or may be cryogenically frozen at a low temperature (e.g., negative eighty degrees Celsius) and arranged in racks for later retrieval. Samples 106 may be preserved for periods of days or years, enabling rapid re-testing to be performed for subjects without the need for re-acquiring genetic material. Storage of the samples 106 provides notable value in the event that contents of a well 132 used for sequencing do not meet with rigorous quality control standards. Specifically, storage enables re-sampling to occur in the event that there is a desire to re-sequence a sample 106.

Extraction. Sample microplates 130 are transferred to a portion of the genomics laboratory 120 dedicated to extraction of the genetic material. The segment of the laboratory 120 that performs extraction and other pre-amplification operations may be sealed from, and/or positively pressurized relative to, other portions of the genomics laboratory 120.

During extraction, a sample microplate 130 is acquired and provided to an LH 140. The LH 140 that performs extraction may be different from the LH 140 that performs sample plating. The LH 140 may apply a reagent to each well 132 that lyses cells within each well. For example, this may be performed in order to lyse white blood cells containing genetic material for a human or may comprise lysing other types of cells to expose other types of genetic material. The reagents used for pre-amplification processes may be stored at the LH 140 in a temperature-controlled manner and may even be vibrated or mixed on a regular basis to ensure that the reagents are evenly distributed in suspension.

In one embodiment, extraction further includes an LH 140 aspirating and dispensing reagents that selectively bind to genetic material released from the lysed cells. This process may include applying a bead (not shown) to the well 132. In one embodiment, the beads comprise magnetic beads that selectively bind to the genetic material (e.g., DNA). This allows for isolation and purification of the genetic material while contaminants remain in solution. In one embodiment, the magnetic bead is drawn to a magnetic base at or under the sample microplate 130. After the genetic material has been drawn to the bead, and after the bead has been secured to the base of the well, a flushing step may be performed wherein remaining fluid in each well is washed away. This ensures that potential impurities are removed from the well. The LH 140 may further add or remove fluid from each well 132 to perform additional concentration and/or elution of the genetic material and may transfer fluid from the wells 132 of the sample microplate 130 to wells 152 of a genome stock microplate 150. The genome stock microplate 150 may be labeled with a unique identifier, and the contents of each well 152 of the genome stock microplate 150 may be associated with a corresponding LSI. In all phases of operation, the LH 140 is operated to ensure that fluid is not transferred between wells 152, as this results in contamination.

In one embodiment, a portion of fluid is removed from each well 152 of the genome stock microplate 150 for quality control purposes. Concentration of genetic material within the wells 152 may be confirmed via testing of this fluid, such as by application of a dye that reacts with the genetic material at known levels of fluorescence for known concentrations.

Library Preparation. After extraction is completed, library preparation may be performed for the contents of the genome stock microplate 150. The bead for each well, including ionically bonded genetic material, is transferred to a distinct well of a library preparation microplate (not shown). The library preparation microplate includes an identifier that distinguishes it from other library preparation microplates, and the LSI associated with each well on the genome stock microplate 150 may be mapped to a corresponding well on the library preparation microplate.

The library preparation microplate may be transferred to a new portion of the genomics laboratory 120 that is sealed from, and/or positively pressurized relative to, other portions of the genomics laboratory 120 that do not perform amplification of genetic material. This feature helps to prevent amplified genetic material from entering portions of the laboratory where genetic material has not been amplified, which could result in contamination. The transfer process may be performed by placing a library preparation microplate into an airlock at the pre-amplification portion of the genomics laboratory 120, sealing the airlock, and then retrieving the library preparation microplate from the airlock via the amplification portion of the genomics laboratory 120.

In one embodiment, a reagent is applied to each well of the library preparation microplate. The reagent ionically bonds to the surface of the bead within the well and does so more strongly than the genetic material. This releases the genetic material from the surface of the bead of each well, enabling the genetic material to be chemically interacted with.

Library preparation may include normalization of a concentration of genetic material in each well of the library preparation microplate. Library preparation further includes fragmentation of the genetic material via an enzyme or via the application of physical forces. During this process, the entire genome (e.g., roughly three billion base pairs for a human genome), may be fragmented into pieces. In one embodiment, the pieces vary between three hundred and four hundred base pairs in length. These pieces are known as nucleic acid fragments.

In this embodiment, the nucleic acid fragments undergo adaptor ligation and indexing in accordance with known techniques. For example, this may comprise Next Generation Sequencing (NGS) library preparation processes defined by Illumina. Next, a limited amount of Polymerase Chain Reaction (PCR) amplification is performed upon the library. The resulting solution is then purified and eluted via operation of an LH 140.

During library preparation, one or more reference samples of genetic material, distinct from the genetic material found in the samples, may be added to wells of the library preparation microplate. The reference samples do not include genetic material received from a customer, but rather include known sequences of base pairs. The reference samples serve as controls to ensure that processes are carried out with sufficient quality.

Upon completion of library preparation, desired fragments of the genetic material (e.g., thousands or millions of distinct fragments of the genetic material, each corresponding with a different portion of a genome of the subject) have been ligated to predefined adapters (e.g., DNA adapters) that bind with the genetic material. Each of the adaptor-ligated fragments is referred to as a "library."

In further embodiments, the probes applied to each well of the library preparation plate include chemical identifiers (colloquially referred to as "barcodes") that are distinct from each other. The use of a different chemical identifier for probes applied to each well of the library preparation microplate enables sequencing to later be performed for multiple subjects on the same flow cell, without conflating sequencing results for those subjects.

The library preparation process may further comprise controlling a concentration of the genetic material in each well, and purification and/or elution of the resulting material. Similar to the processes performed after extraction of genetic material, concentration of genetic material after library preparation may be confirmed for each well via testing.

Enrichment. After library preparation, enrichment processes may be performed in order to either directly amplify (e.g., via amplicon or multiplexed PCR) or capture (e.g., via hybrid capture) predefined libraries. This enhances the case of sequencing desired portions of the genome.

In one embodiment, during enrichment, customized biotinylated oligonucleotide probes are applied to the libraries. The probes selectively hybridize genetic material occupying desired portions of the genome for the genetic material, such as specific genes, or the entire exome. Magnetic beads bind to biotin molecules in the probes to attach the hybridized material to the magnetic beads. Magnetic forces capture the beads in place, enabling remaining fluid within each well to be removed or washed out, thereby removing impurities and leaving the genetic material that is desired. Genetic material may be released from the beads in a similar manner to that discussed above for prior processes.

In a further embodiment, hybrid capture target enrichment is performed. During this process, the probes comprise tailored oligonucleotides that are chosen to bind to the genetic material. The range of probes may be tailored as a group to bind to specific alleles, specific genes, the exome, the entire genome, etc. That is, each probe may bind to a nucleic acid fragment at a specific location on the genome, and the range of probes may be selected to ensure that alleles, genes, the exome, or the entire genome of the subject being considered is acquired. Utilizing probes in this manner may enhance efficiency of the sequencing process, by foregoing the need to sequence all of the roughly three billion base pairs found in the human genome.

The enrichment process may further comprise controlling a concentration of the genetic material in each well, and purification and/or elution of the resulting material. Similar to the processes performed after extraction of genetic material, concentration of genetic material after enrichment may be confirmed for each well via testing.

Sequencing. Sequencing may be performed according to any of a variety of techniques, including short-read and long-read techniques, via sequencing equipment 160 (e.g., an Illumina NovaSeq X sequencing machine). In one embodiment, the sequencing is performed as Sequencing by Synthesis (SBS). For example, sets of enriched libraries of genetic material bound to probes in earlier steps may be transferred to a flow cell, and annealed to oligonucleotide probes within the flow cell. At this stage, the contents of multiple wells may be applied to the same flow cell, because the libraries within those wells are tagged with the chemical identifiers referred to above. In one embodiment, the chemical identifiers comprise nucleotide sequences that are detectable during the sequencing process to determine a corresponding LSI.

Complementary sequences may then be created via enzymatic extension to create a double-stranded portion of genetic material. The double-stranded genetic material may then be denatured, and the library fragment may be washed away. Bridge amplification may then be performed to create copies of the remaining molecule in a localized cluster. For example, a cluster may comprise twenty to fifty copies of the same molecule, localized to a location of a size smaller than a pinhead on the flow cell.

In this embodiment, sequencing primers are annealed to library adapters in order to prepare the flow cell for SBS. During SBS, the sequencing primer uses reverse terminator fluorescent oligonucleotides, one base per cycle, for a number of cycles (e.g., one hundred and fifty cycles) in the forward direction. After the addition of each nucleotide, clusters are excited by a light source, resulting in fluorescence which can be measured. The emission wavelength and signal intensity for each cluster determines a base call for that cluster. Fluorescent moieties are then flushed from the flow cell. A chemical group blocking a 3' end of the fragment is then removed, enabling a subsequent nucleotide to be read. This tightly controls nucleotide addition and detection.

Additionally in this embodiment, base calls across cycles at the same physical location on the flow cell occur at the same cluster, and hence indicate sequential reads for copies of the same fragment of the genetic material. After each cycle, denaturing and annealing are performed to extend the index primer. A complementary reverse strand is created and extended via bridge amplification. The reverse strand is then read in the reverse direction for a number of cycles, in a manner similar to reads in the forward direction.

Depending on whether a complete human genome, or another set of genomic data, is being tested, different reagents (e.g., probes, primers, etc.) may be chosen. That is, different reagents may be utilized for library preparation for a pathogen (e.g., bacteria, virus) or an organelle (e.g., mitochondria) than for a human genome. Pathogens exhibiting Ribonucleic Acid (RNA) genomes may have their genetic material translated to DNA before sequencing, enrichment, and/or library preparation are performed, via known techniques, such as Next Generation Sequencing (NGS) techniques.

Throughout the processes discussed above, the laboratory environment may be carefully controlled to ensure quality. For example, temperature within each segment of the laboratory may be carefully monitored and controlled, and ultraviolet lighting or other features capable of inactivating genetic material may be carefully positioned to ensure that contamination does not occur.

Bioinformatics. Sequencing data may be stored in any suitable format. In one embodiment, raw sequencing data generated during synthesis is stored in a file format such as Binary Base Call (BCL). This raw data may be fed to an analytical pipeline such as a cloud-based computing environment. Raw sequencing data may be processed by the pipeline into a second format, such as a text-based FASTQ format, that reports quality scores. The second format may then analyze to perform alignment of sequence reads to a reference genome, such as a reference genome reported in a Browser Extensible Data (BED) file. The aligned sequence data may be reported as a Binary Alignment Map (BAM) file or Compressed Reference-oriented Alignment Map (CRAM) file. The aligned sequence data may then be called, resulting in a Variant Call Format (VCF) file reporting called variants at each location of the genome that was sequenced, together with secondary metrics such as quality indicator metrics. As used herein, a variant comprises a unique combination of genetic information, in the form of consecutive base pairs at a specific set of locations (e.g., genomic coordinates) along a portion of a chromosome. Each variant is distinguished from other variants by having a different combination of base pairs along the set of locations. This may be due to Single Nucleotide Polymorphisms (SNPs) which relate to common single nucleotide changes, Single Nucleotide Variants (SNVs) which relate to rare nucleotide changes, insertions and/or deletions (Indels) which relate for example to the insertion or deletion of less than thirty base pairs, or differing numbers of repetitions, Copy Number Variants (CNVs), which relate to larger insertions or deletions, translocations, inversions, other types of genetic variants, or even combinations of variants, such as haplotypes or Multi-nucleotide variants (MNVs).

The called sequence data may be provided to a data analyst via a User Interface (UI), such as a Graphical User Interface (GUI) presented via a display. The technician may then validate the resulting called sequence data and release it for reporting to subjects, health care providers, and/or scientists.

Figure 2:
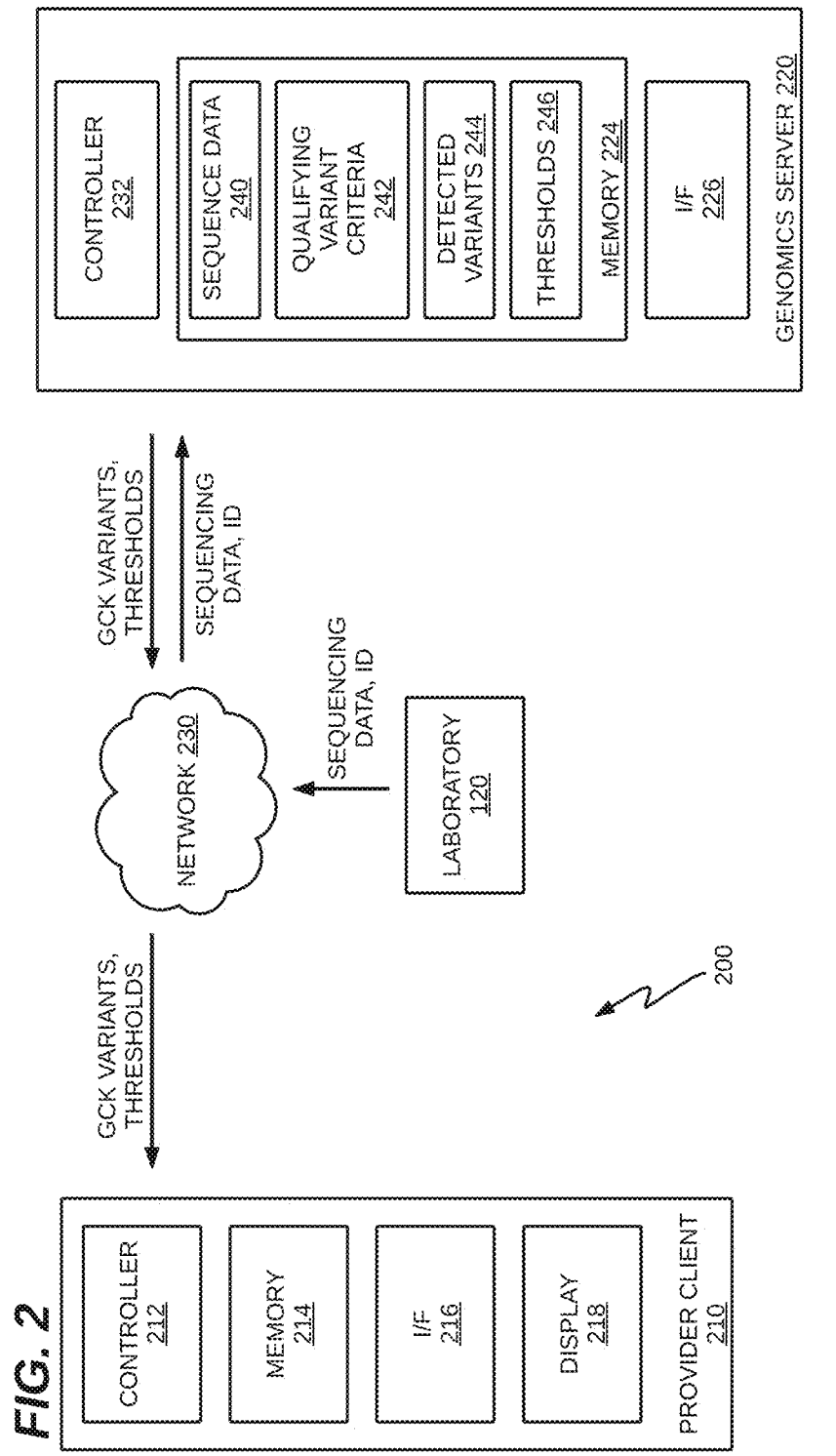
FIG. 2 is a block diagram illustrating a genomics architecture in an illustrative embodiment.

Genomics architecture. FIG. 2 is a block diagram illustrating a genomics architecture 200 in an illustrative embodiment. Genomics architecture 200 comprises any combination of systems and devices operable to review, process, and/or control access to sequencing data, including sequencing data received from genomics laboratory 120. In this embodiment, genomics architecture 200 comprises a genomics server 220 which receives sequencing data and identifiers (e.g., CSIs 108, LSIs, etc.) from genomics laboratory 120, via network 230.

Genomics server 220 receives the sequencing data via interface (I/F) 226, such as an Ethernet interface, wireless interface compliant with Institute of Electrical and Electronics Engineers (IEEE) 802.11 standards, or other physical interface capable of transmitting and receiving digital data. The sequencing data 240 is stored in memory 224 for the population of patients (e.g., millions of patients) that have been sequenced by laboratory 120 and may be maintained in any suitable format. Examples of such formats include CRAM, VCF, BAM, and others. Memory 224 may store, for example, sequence data 240 describing multiple patients, and this sequence data 240 may be maintained in a de-identified format to facilitate the advancement of research. Memory 224 may be implemented via a cloud storage service or may comprise a storage medium such as a hard disk or flash memory device.

Memory 224 additionally stores qualifying variant criteria 242, detected variants 244, and thresholds 246 for diagnosis and/or treatment of breast cancer. In one embodiment, the portion of memory 224 storing these components is distinct from the portion of memory 224 storing sequence data 240.

Controller 232 manages the operations of genomics server 220 and may for example analyze sequence data 240 to identify detected variants 244, control access and authentication related to sequence data 240, communicate with one or more provider clients 210, and/or perform additional operations. Controller 232 may be implemented, for example, as custom circuitry, as a hardware processor executing programmed instructions, as a combination of shared hardware processing resources implementing a compute service, or some combination thereof.

Genomics architecture 200 further comprises provider client 210, which is configured to receive information regarding detected variants 244 and/or thresholds 246. In this embodiment, provider client 210 includes a controller 212, a memory 214, an interface (I/F) 216, and a display 218. Controller 212 manages the operations of the provider client 210, and may be implemented, for example, as custom circuitry, as a hardware processor executing programmed instructions, or some combination thereof. Memory 214 comprises information for interpreting the data received via I/F 216. Display 218 may comprise a projector, screen, etc. for presenting information to a user of provider client 210.

Interpreting Sequencing Data. After sequencing data for the patient has been acquired (e.g., based on analysis of a sample 106 provided by the patient), sequencing data for the following genes is reviewed for that patient by controller 232 of genomics server 220 (genomic coordinates provided for GRCh38): BRCA1 (17:43,044,295-43,170,327); BRCA2 (13:32,315,508-32,400,268); PALB2 (16:23,603,165-23,641,310); ATM (11:108,223,067-108,369,102); CHEK2 (22:28,687,743-28,741,834). Furthermore, a set of genomic data (e.g., indicating the presence (and the specific genotype or number of alternate alleles) or nonexistence of SNPs, SNVs, etc. at predefined locations within the genome) is analyzed for generation of a polygenic risk score. For example, the set of genomic data and polygenic risk scoring process may include that that reported in Mavaddat N, Michailidou K, Dennis J, et al. "Polygenic Risk Scores for Prediction of Breast Cancer and Breast Cancer Subtypes." Am J Hum Genet. 2019; 104 (1): 21-34. In further embodiments, polygenic risk scoring is performed by calculating a weighted combination of values applied for each of multiple genetic loci where Single Nucleotide Polymorphisms (SNPs) have been detected within a predefined set of genetic loci.

In one embodiment, reviewing sequencing data for the patient comprises inspecting VCF data within the genomic coordinates recited above, and using a tool such as the Ensembl Variant Effect Predictor (VEP) to determine whether any called variants are expected to lead to a protein that is non-functional, or that cannot perform its usual function. These are referred to as "Loss of Function" (LoF) variants. LoF variants may include base pairs that indicate stop_lost, start_lost, splice_donor_variant, frameshift_variant, splice_acceptor_variant, or stop_gained. Such variants may include frame shift mutations, nonsense mutations, mutations at splice sites, insertions and/or deletions that result in stop codons, and others. Reviewing sequencing data for the patient may further comprise inspecting VCF data and using the Ensembl VEP to identify coding variants within the corresponding gene. Coding variants comprise mutations that alter the amino acid coded for by the corresponding gene, but do not necessarily inactivate (or truncate) that gene. For example, coding variants may include base pairs, residing in predetermined portions of the gene, that indicate stop_lost, mis-sense_variant, start_lost, splice_donor_variant, inframe_deletion, frameshift_variant, splice_acceptor_variant, stop_gained, or inframe_insertion.

Collectively, LoF variants and coding variants for genes are referred to herein as "qualifying variants." In one embodiment, qualifying variants do not include Polyphen benign or Sorting Intolerant From Tolerant (SIFT) benign variants. Polyphen benign variants may be considered any variants having a Polyphen value less than 0.15, while SIFT benign may be considered any variants having a SIFT value that is greater than 0.05. In a further embodiment, variants having other predicted molecular properties, such as splice site variants, etc. are considered qualifying variants. The combination of criteria used to classify a variant as a qualifying variant is maintained in qualifying variant criteria 242, which is stored in memory 224.

The review process for detecting qualifying variants in each gene for each patient may be performed automatically by an analytical tool to classify the patient as having an LoF variant, coding variant, or neither in the gene. For example, qualifying variants may be defined as including LOF variants having a Minor Allele Frequency (MAF) below 0.1%, and further including coding variants that are predicted as damaging by either SIFT or PolyPhen.

Figure 3:
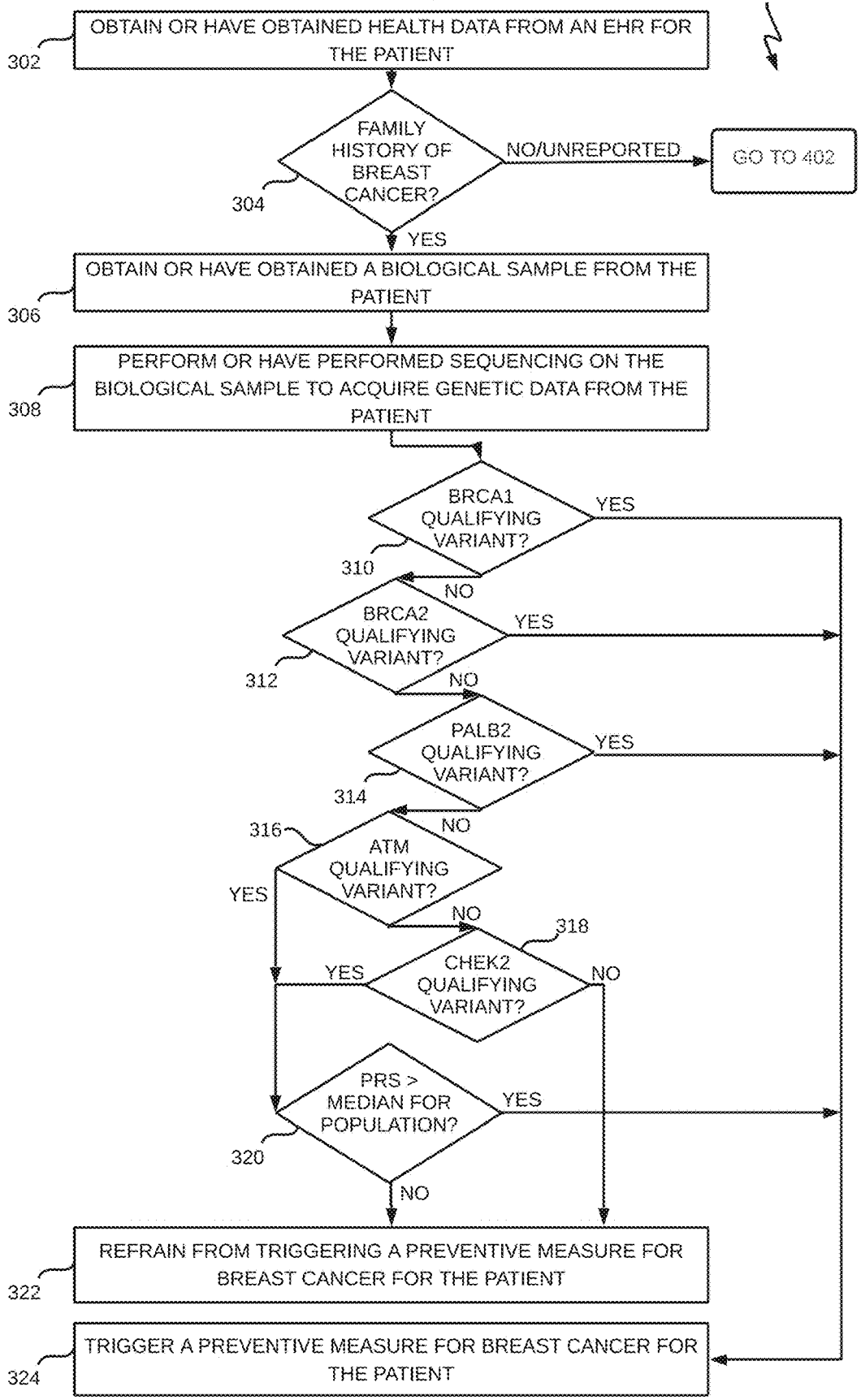
FIGS. 3-4 are flowcharts depicting methods of selectively performing preventive measures for breast cancer based on genetic data, in an illustrative embodiment.
Figure 4:
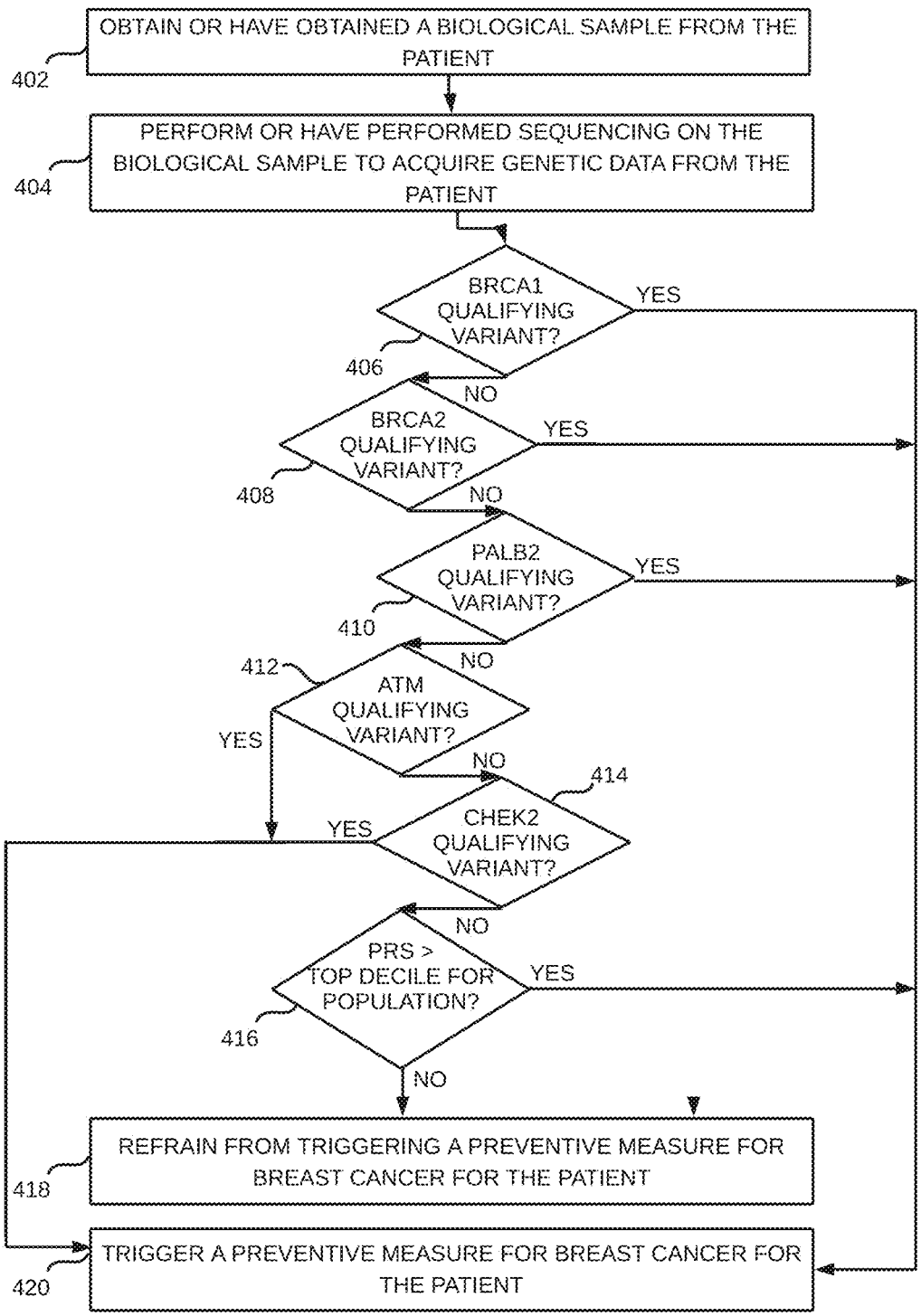

FIGS. 3-4 are flowcharts depicting methods of providing alternative screening and preventive care methods for breast cancer risk, based sequencing data in an illustrative embodiment.

The steps of the methods herein are described with reference to sample processing architecture 100 of FIG. 1 and genomics architecture 200 of FIG. 2, but those skilled in the art will appreciate that these methods may be performed in other systems. The steps of the flowcharts described herein are not all inclusive and may include other steps not shown. The steps described herein may also be performed in an alternative order.

Classification of High Risk Patients

FIG. 3 provides a method 300 of selectively performing preventive care for breast cancer upon a female patient (e.g., a patient of female sex, or a patient assigned female sex at birth), based on a combination of family history status and sequencing results for that patient. The methods described herein may be foregone for male patients in some embodiments.

Step 302 comprises obtaining or having obtained health data from an Electronic Health Record (EHR) for a patient. The health data may comprise billing and/or diagnostic codes, notes, and/or other materials. The EHR may be obtained, for example, via an authorized access to a health record system of a health care network that provides care for the patient, such as via an Application Programming Interface (API) other resource. If data from the EHR indicates that a family history of breast cancer exists for the patient in step 304 (e.g., as indicated by a corresponding predefined code, such as an International Classification of Diseases (ICD) or Current Procedural Terminology (CPT) code, or natural language search of the EHR), then processing proceeds to step 306. Alternatively, if a family history of breast cancer is nonexistent or unreported, processing continues to method 400 of FIG. 4.

Step 306 comprises obtaining (or having obtained) a biological sample from the patient, such as a sample 106 of blood or saliva. Step 308 includes performing (or having performed) sequencing on the biological sample to determine whether the patient is a carrier of qualifying variants in the genes being considered. In one embodiment, each qualifying variant is selected from the group consisting of LoF variants and coding variants. Step 308 may be performed via the genomics laboratory and bioinformatics processes discussed above with reference to FIG. 1, or via any suitable sequencing technique. In one embodiment, such a determination is made whenever a qualifying variant is called in a VCF file or similar data structure. In a further embodiment, such a determination is made whenever a qualifying variant has been confirmed by a variant scientist or automated system and indicated in metadata accompanying the sequencing data for the patient.

In step 310, if the sequencing data indicates the presence of a qualifying variant in BRCA1, processing continues to step 324, wherein a preventive measure for breast cancer is performed for the patient. If there is no such qualifying variant, processing proceeds to step 312.

In step 312, if the sequencing data indicates the presence of a qualifying variant in BRCA2, processing continues to step 324, wherein a preventive measure for breast cancer is performed for the patient. If there is no such qualifying variant, processing proceeds to step 314.

In step 314, if the sequencing data indicates the presence of a qualifying variant in PALB2, processing continues to step 324, wherein a preventive measure for breast cancer is performed for the patient. If there is no such qualifying variant, processing proceeds to step 316.

In step 316, if the sequencing data indicates the presence of a qualifying variant in ATM, processing continues to step 320. If there is no such qualifying variant, processing proceeds to step 318.

In step 318, if the sequencing data indicates the presence of a qualifying variant in CHEK2, processing continues to step 320. If there is no such qualifying variant, processing proceeds to step 322, and the system refrains from performing a preventive measure for breast cancer for the patient.

In step 320, the system reviews a Polygenic Risk Score (PRS) pertaining to the patient. The PRS may be calculated according to any accepted heuristic. In many embodiments, the PRS comprises a weighted sum of values applied to each detected SNP within a set of predefined loci at the genome. For example, a PRS may be calculated according to the techniques described in Mavaddat N, Michailidou K, Dennis J, et al. "Polygenic Risk Scores for Prediction of Breast Cancer and Breast Cancer Subtypes." Am J Hum Genet. 2019; 104(1): 21-34, herein incorporated by reference. In a further example, the PRS comprises an aggregate score based on at least three hundred loci at the genome. For many PRS calculations, a higher PRS is indicative of higher risk.

In one embodiment, PRS is calculated according to the formula below, wherein Bj comprise a per-allele log Odds Ratio (OR) for breast cancer associated with SNP j, xk is the allele dosage for SNP k, and n is the total number of SNPs included in the PRS:

$$PRS = \beta 1 x1 + \beta 2 x2 + \ldots + \beta j xj \ldots + \beta n xn \qquad (1)$$

In many embodiments, statistical information (e.g., median, top decile, standard deviation, etc.) for the distribution of PRS across the population is determined by calculation prior to method 300 (e.g., after a representative portion of a population has been sequenced) as part of an initialization process. As used herein, the population comprises a representative demographic grouping for the patient (e.g., a demographic grouping that the patient belongs to), such as a set of the general population, a set of women in the general population, another representative demographic group, etc. In one embodiment, the population comprises a group of at least one thousand individuals, such as thirty thousand individuals or more.

If the PRS for the patient is above a median for the population, then processing continues to step 324 and a preventive measure for breast cancer is triggered. As used herein, preventive measures refer to a level of screening or care, pertaining to breast cancer, that is greater than the baseline level of screening or care provided to female patients in the general population. For example, a preventive measure may comprise any techniques that increase the likelihood of detection of breast cancer. This may include a more rigorous imaging schedule, such as the scheduling of periodic Magnetic Resonance Imaging (MRI) of the breasts, or an increased frequency (or earlier initiation age) for mammograms. In one embodiment, this comprises a referral to a high-risk clinic that specializes in breast cancer care. In many embodiments, preventive measures include interventions that actively reduce the risk of developing breast cancer. This may include lumpectomies, mastectomies, and/or other surgical procedures, as well as lifestyle changes that relate to diet, exercise, exposure to carcinogens, etc.

In one embodiment, a preventive measure is triggered by generating an electronic or physical report suggesting that a patient or medical practitioner perform a preventive measure. The report may explicitly provide a list of possible preventive measures. In further embodiments, the preventive measure is triggered by updating a Graphical User Interface (GUI) with an option to perform a preventive measure (e.g., by generating a referral, generating directions for a patient relating to preventive care, etc.), updating an EHR for the patient (e.g., by transmitting a message to provider client 210), etc.

Alternatively, if the PRS for the patient is below the median for the population, processing continues to step 322, wherein the system refrains from triggering a preventive measure for breast cancer for the patient.

In a further embodiment, detection of a family history of breast cancer for the patient also triggers preventive measures in step 324.

FIG. 4 provides a further method 400 of selectively performing a preventive measure for breast cancer upon a female patient, based on sequencing results for that patient when a family history of breast cancer for that patient is unknown. Step 402 comprises obtaining (or having obtained) a biological sample from the patient, such as a sample 106 of blood or saliva. Step 404 includes performing (or having performed) sequencing on the biological sample to determine whether the patient is a carrier of qualifying variants in the genes being considered. The qualifying variant is selected from the group consisting of LoF variants and coding variants in BRCA1, BRCA2, PALB2, ATM, and CHEK2. Step 404 may be performed via the genomics laboratory and bioinformatics processes discussed above with reference to FIG. 1, or via any suitable sequencing technique. In one embodiment, such a determination is made whenever a qualifying variant is called in a VCF file or similar data structure. In a further embodiment, such a determination is made whenever a qualifying variant is confirmed by a variant scientist or automated system.

In step 406, if the sequencing data indicates the presence of a qualifying variant in BRCA1, processing continues to step 420, wherein a preventive measure for breast cancer is performed for the patient. In such a circumstance, a patient may be classified as high risk. If there is no such qualifying variant, processing proceeds to step 408.

In step 408, if the sequencing data indicates the presence of a qualifying variant in BRCA2, processing continues to step 420, wherein a preventive measure for breast cancer is performed for the patient. If there is no such qualifying variant, processing proceeds to step 410.

In step 410, if the sequencing data indicates the presence of a qualifying variant in PALB2, processing continues to step 420, wherein a preventive measure for breast cancer is performed for the patient. If there is no such qualifying variant, processing proceeds to step 412.

In step 412, if the sequencing data indicates the presence of a qualifying variant in ATM, processing continues to step 420. If there is no such qualifying variant, processing proceeds to step 414.

In step 414, if the sequencing data indicates the presence of a qualifying variant in CHEK2, processing continues to step 420. If there is no such qualifying variant, processing proceeds to step 416.

In step 416, the system reviews a PRS pertaining to the patient. The PRS may be calculated according to any accepted heuristic. In many embodiments, the PRS comprises a weighted sum of values applied to each detected SNP at a set of predefined locations. A higher PRS is indicative of higher risk. In many embodiments, statistical information (e.g., median, top decile, standard deviation, etc.) for the distribution of PRS across the population is determined by calculation prior to method 400 (e.g., after a representative portion of a population has been sequenced) as part of an initialization process.

If the PRS for the patient is above a top decile for the population that the patient belongs to (e.g., the general population or a specific demographic group), then processing continues to step 420 and a preventive measure for breast cancer is triggered. Alternatively, if the PRS for the patient is below the top decile for the population, processing continues to step 418, wherein the system refrains from triggering a preventive measure for breast cancer for the patient.

In a further embodiment, the outcome of method 400 is intentionally unaffected by reported family history for the patient. That is, the classification into high risk is not impacted by reported family history.

Methods 300-400 of FIGS. 3-4 provide a notable technical benefit in that they accurately categorize risk based on multiple potential genetic factors that may contribute to breast cancer. This reduces the potential for unnecessary treatment, which reduces the potential for medical resources to be wasted.

FIG. 5 is a table 500 that summarizes sequence data for individuals in an illustrative embodiment. For example, table 500 may be one of many data structures stored in genomics server 220. In this embodiment, table 500 includes an entry 510 for each of multiple patients. Each entry 510 includes a unique identifier (e.g., LSID) for the corresponding patient, as well as an indication of the gene that the sequence data relates to. The portion of the genome that has been sequenced may comprise whole genome data, whole exome data, array data, data for a specific gene or portion of a gene, etc. In this embodiment, the sequence data relates to the various genes discussed above.

Table 500 also includes a link to sequence data for each patient and indicates a format of the sequence data. In one embodiment, the sequence data indicates base pairs of the corresponding individual, together with the positions of those base pairs along a portion of a chromosome. In a further embodiment, the sequence data is stored as VCF and/or BED data, although any suitable technique for storing the sequence data may be utilized. In this manner, a controller 232 of the genomics server 220 may use the table 500 to rapidly identify the qualifying variants of the considered genes carried by each patient. In further embodiments, controller 232 updates table 500 to list qualifying variants detected for each patient.

FIG. 6 is a table 600 that summarizes variant data for individuals in an illustrative embodiment. In this embodiment, each entry 610 in table 600 reports a location (e.g., chromosomal coordinate) for each genetic variant detected in the genes being considered, together with flags indicating whether the variant is an LoF or coding variant. Table 600 further includes a VCF reference, which refers to the location and/or identifier of a VCF file that indicates the presence of the variant. Table 600 may be utilized by controller 232 of genomics server 220, in order to rapidly select and report diagnostic and treatment thresholds for a patient.

FIG. 7 is a table depicting EHR data in an illustrative embodiment. In this embodiment, the results are provided as entries 710 which are each associated with an LSID. However, in further embodiments, a CSI or patient identifier is utilized, or an identifier for an EHR of the patient, etc. Table 700 may be utilized, for example, by provider client 210 or genomics server 220 to determine whether an altered threshold for diagnosis and intervention should be applied to a patient.

Figure 8:
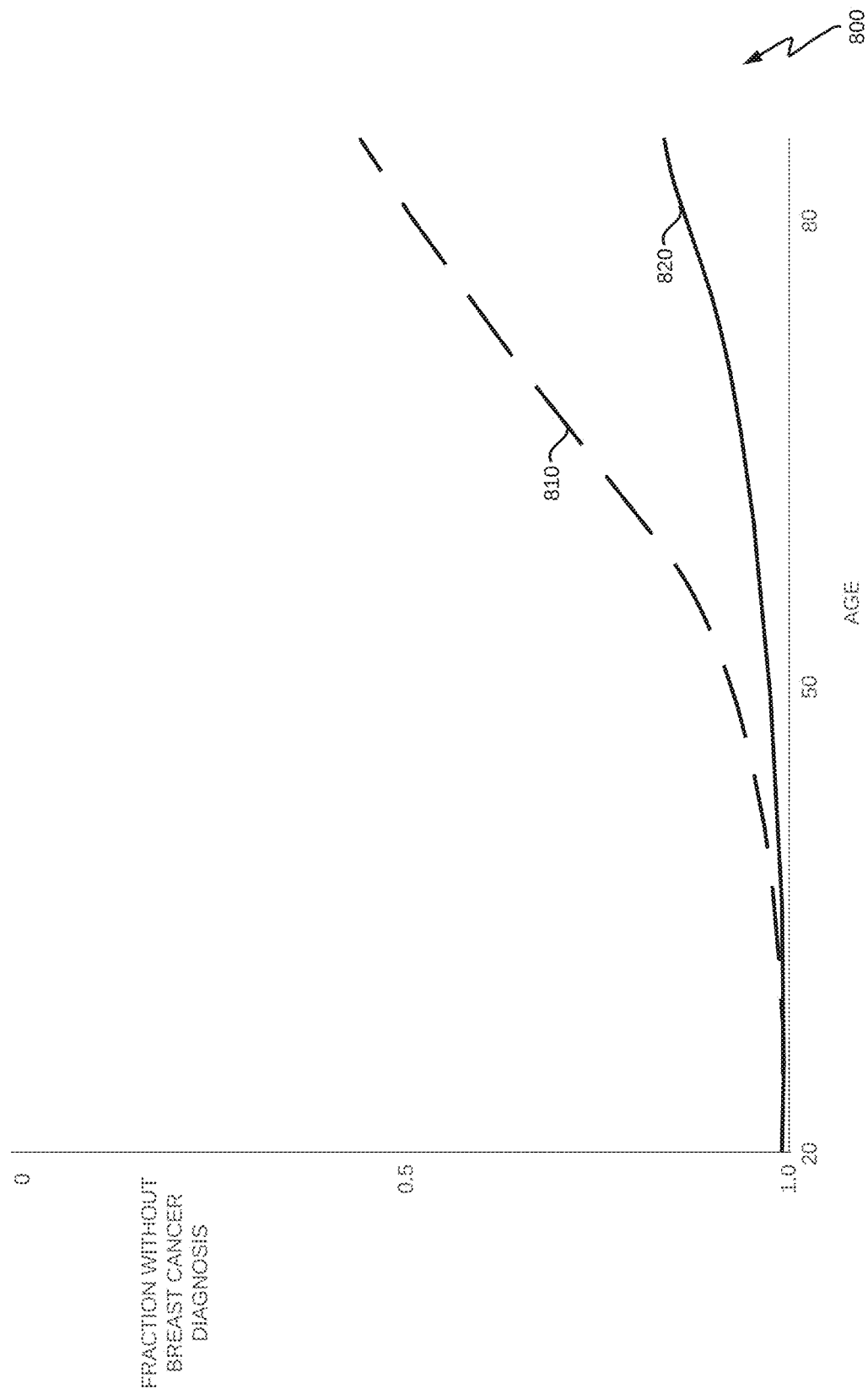
FIGS. 8-9 are diagrams depicting risk stratification for breast cancer in an illustrative embodiment.

FIG. 8 is a diagram 800 depicting risk stratification between those selected for preventive measures according to method 300 of FIG. 3, and the general population. Specifically, diagram 800 shows that patients screened using method 300 who proceed to step 324 of triggering a preventive measure for breast cancer are notably more likely to develop breast cancer as they age. This is indicated by line 810 which indicates a risk of patients that reach step 324, as compared with line 820, which indicates risk for the general population. Hence, it is highly beneficial for this at-risk group to receive preventive measures. Analysis of a population found that screening with the technique discussed in method 300 shows that the group selected to receive preventive measures falls into the "high risk" category defined by the American Cancer Society (ACS) (e.g., 20-25% or higher risk than the baseline population) by age 70.

Figure 9:
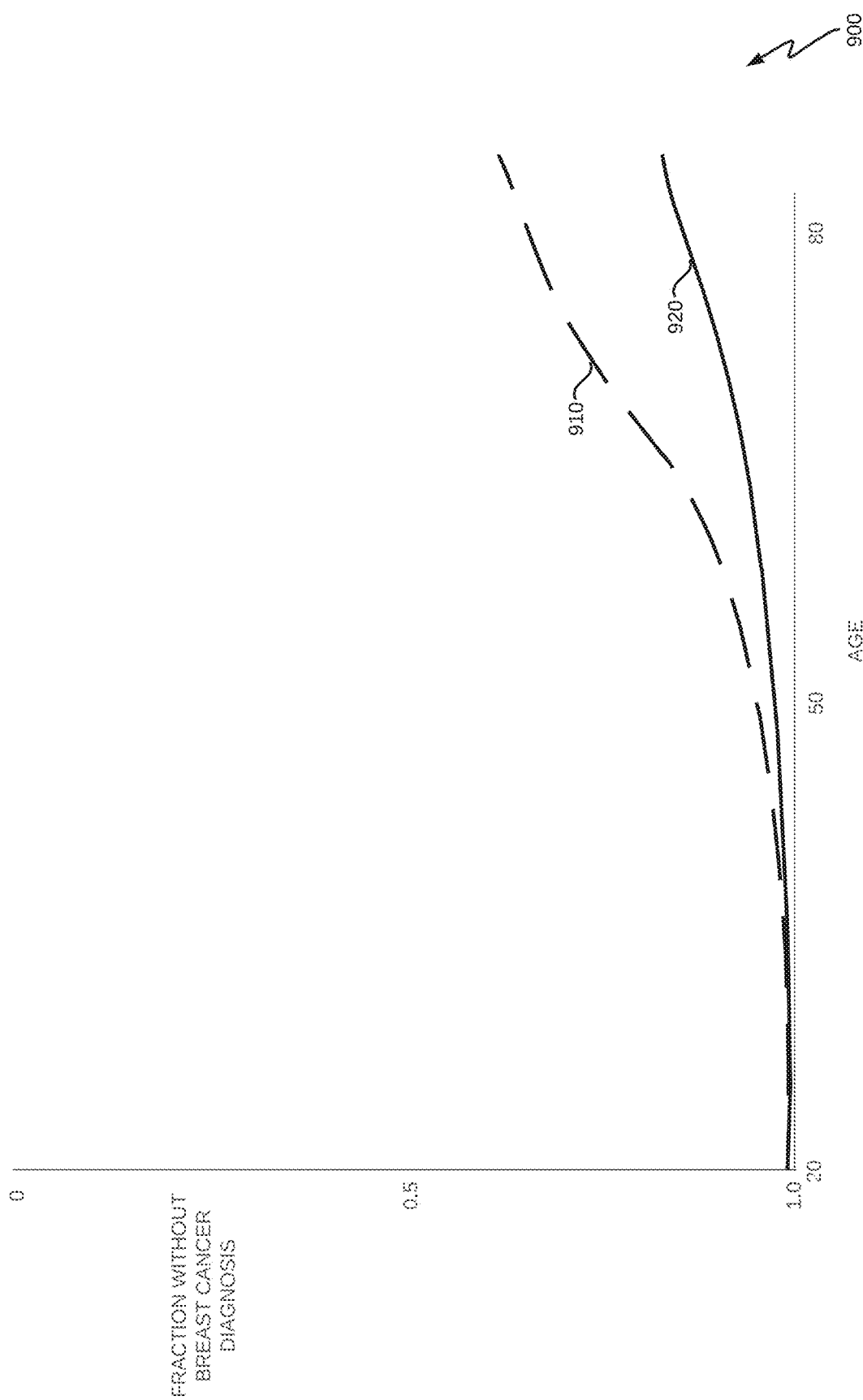

FIG. 9 is a diagram 900 depicting risk stratification between those selected for preventive measures according to method 400 of FIG. 4, and the general population. Specifically, diagram 900 shows that patients screened using method 400 who proceed to step 420 of triggering a preventive measure for breast cancer are notably more likely to develop breast cancer as they age. This is indicated by line 910 which indicates a risk of patients that reach step 420, as compared with line 920, which indicates risk for the general population. Hence, it is highly beneficial for this at-risk group to receive preventive measures. This also shows that the group selected to receive preventive measures falls into the "high risk" category defined by the ACS by age 70.

Figure 10:
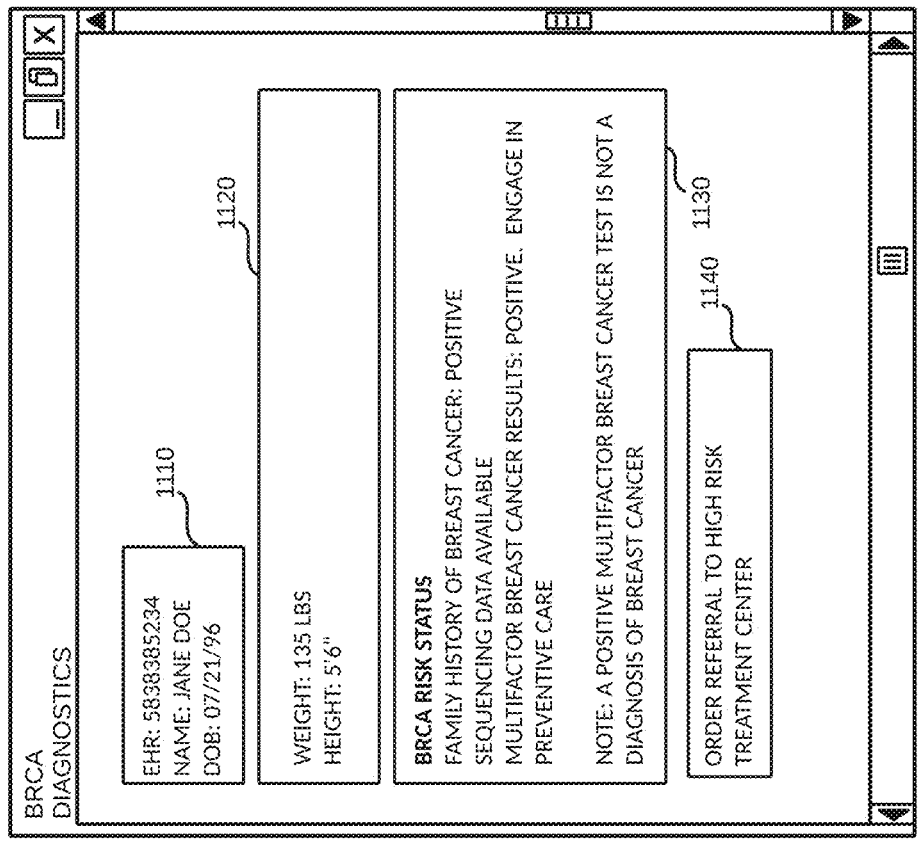
FIGS. 10-11 depict Graphical User Interfaces (GUIs) that facilitate genetic screening for patients, and/or the application of preventive measures, in illustrative embodiments.

FIG. 10 depicts a Graphical User Interface (GUI) 1000 that dynamically recommends sequencing for female patients to determine breast cancer risk for screening purposes. In this embodiment, GUI 1000 includes region 1010 which provides identifying information for a patient, and region 1020 which depicts phenotypic information for the patient. Regions 1010 and 1020 may be populated, for example, by accessing data within an EHR for the patient maintained at a server accessed by provider client 210 of FIG. 2. Region 1030 provides an indication of whether family history of breast cancer for the patient is known, such as based on information in the EHR. In one embodiment the EHR does not include family history of breast cancer status, and the provider client 210 transmits a message to the patient requesting this information. If genomics server 220 has the sequencing data, a medical practitioner may press button 1040 to order this information from genomics server 220 for instant delivery of sequencing information. Alternatively, if genomics server 220 does not have this sequencing data, a press of button 1040 may trigger an order for a blood draw or saliva sample to be provided to genomics laboratory 120 for sequencing.

Figure 11:
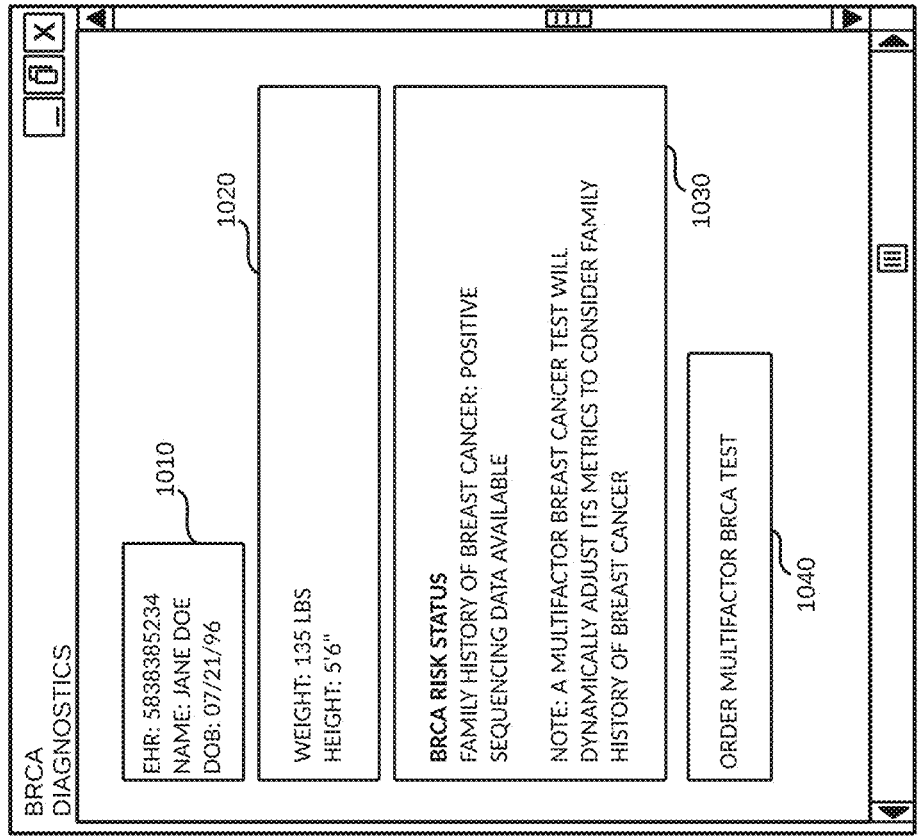

FIG. 11 depicts a Graphical User Interface (GUI) 1100 that dynamically recommends preventive care for patients who meet genetic screening criteria for breast cancer. GUI 1100 may be a variation of GUI 1000 of FIG. 10. Regions 1110 and 1120 may be populated, for example, by accessing an EHR for the patient maintained at a server accessed by provider client 210 of FIG. 2. Region 1130 provides an indication of whether a family history of breast cancer for the patient is known. In this embodiment, a family history of breast cancer for the patient is both known and positive. Thus, GUI 1100 presents recommendations for engaging in preventive care in region 1130. Furthermore, because the patient meets the screening criteria for high-risk patients, button 1040 of FIG. 10 is replaced with button 1140 of FIG. 11. In this instance, button 1140 provides for directly referring the patient to a high-risk treatment center.

Computer Embodiment

Any of the various computing and/or control elements shown in the figures or described herein may be implemented as hardware, as a processor implementing software or firmware, or some combination of these. For example, an element may be implemented as dedicated hardware. Dedicated hardware elements may be referred to as "processors," "controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Figure 12:
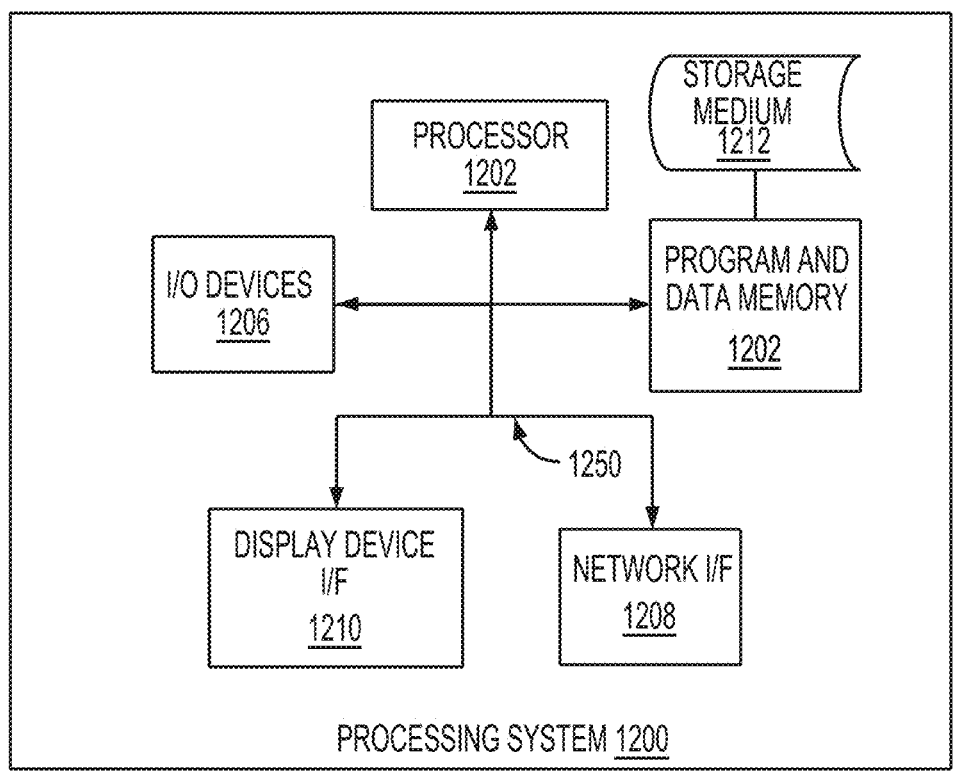
FIG. 12 depicts an illustrative computing system operable to execute programmed instructions embodied on a computer readable medium.

In one embodiment, instructions stored on a computer readable medium direct a computing system of any of the devices and/or servers discussed herein, such as genomics server 220, to perform the various operations disclosed herein. FIG. 12 depicts an illustrative computing system 1200 operable to execute a computer readable medium embodying programmed instructions. Computing system 1200 is operable to perform the above operations by executing programmed instructions tangibly embodied on computer readable storage medium 1212. In this regard, embodiments may utilize instructions (e.g., code) accessible via computer-readable medium 1212 for use by computing system 1200 or any other instruction execution system. For the purposes of this description, computer readable medium 1212 comprises any physical media that is capable of storing a program for use by computing system 1200. For example, computer-readable medium 1212 may be an electronic, magnetic, optical, electromagnetic, infrared, semiconductor device, or other non-transitory medium. Examples of computer-readable medium 1212 include a solid-state memory, a magnetic tape, a removable computer diskette, a random access memory (RAM), a read-only memory (ROM), a rigid magnetic disk, and an optical disk. Current examples of optical disks include Compact Disk-Read Only Memory (CD-ROM), Compact Disk-Read/Write (CD-R/W), Digital Video Disc (DVD), and Blu-Ray Disc.

Computing system 1200, which stores and/or executes the instructions, includes at least one processor 1202 coupled to program and data memory 1204 through a system bus 1250. Program and data memory 1204 include local memory employed during actual execution of the program code, bulk storage, and/or cache memories that provide temporary storage of at least some program code and/or data in order to reduce the number of times the code and/or data are retrieved from bulk storage (e.g., a spinning disk hard drive) during execution.

Input/output or I/O devices 1206 (including but not limited to keyboards, displays, touchscreens, microphones, pointing devices, etc.) may be coupled either directly or through intervening I/O controllers. Network adapter interfaces 1208 may also be integrated with the system to enable computing system 1200 to become coupled to other computing systems or storage devices through intervening private or public networks. Network adapter interfaces 1208 may be implemented as modems, cable modems, Small Computer System Interface (SCSI) devices, Fibre Channel devices, Ethernet cards, wireless adapters, etc. Display device interface 1210 may be integrated with the system to interface to one or more display devices, such as screens for presentation of data generated by processor 1202.

Classification of Low Risk Patients

Figure 13:
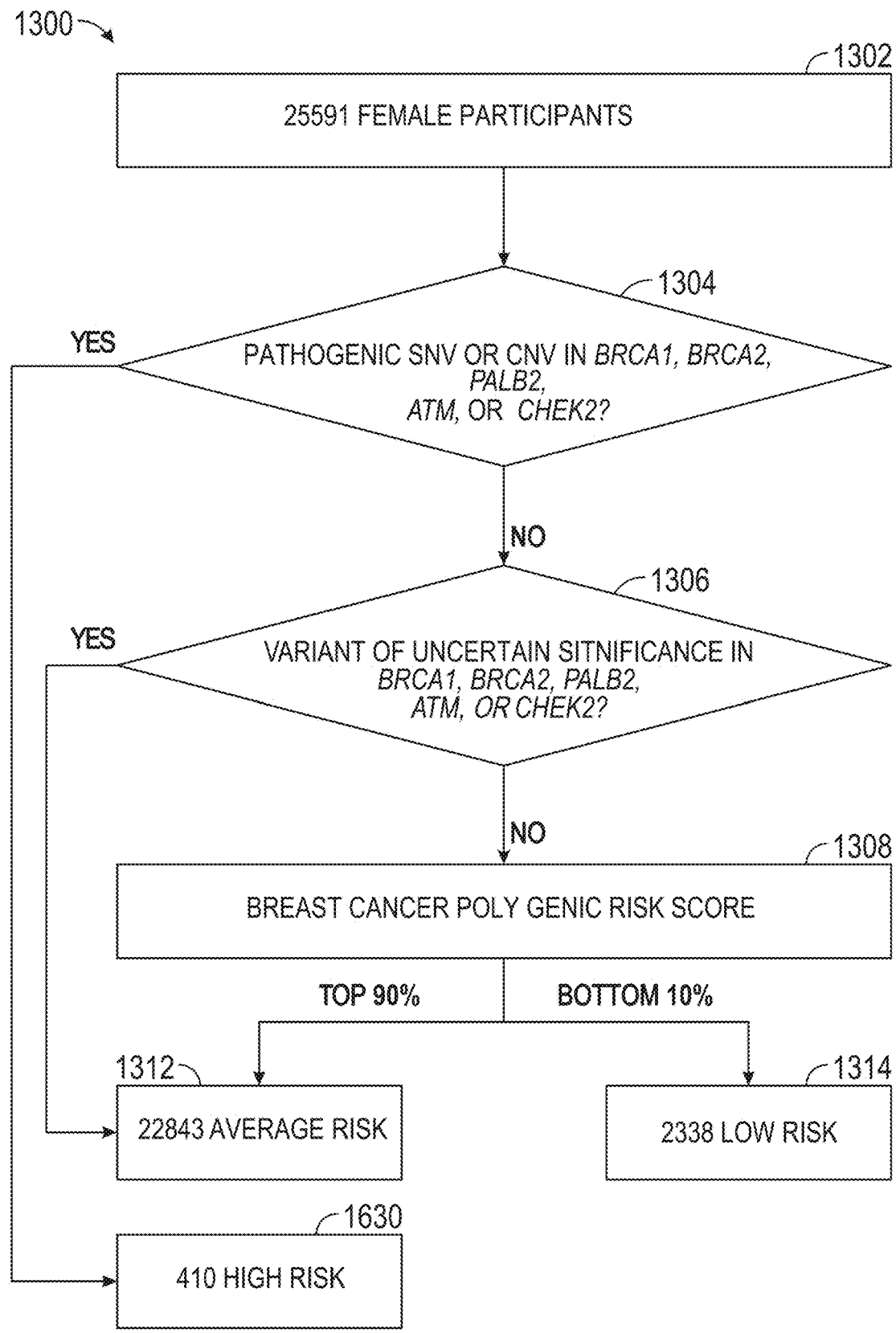
FIG. 13 is a flowchart depicting a method of selectively performing preventive measures for breast cancer based on genetic data, in an illustrative embodiment.

FIG. 13 is a flowchart depicting a method 1300 of selectively performing preventive measures for breast cancer based on genetic data, in an illustrative embodiment. The method 1300 can produce genetic risk stratification data.

The method 1300 can be used for selectively performing preventive care for breast cancer upon a female patient (e.g., a patient of female sex, or a patient assigned female sex at birth), based on a combination of sequencing results and polygenic risk assessment for that patient. The methods described herein may be foregone for male patients in some embodiments.

Step 1302 comprises patient data. This includes obtaining or having obtained health data from an Electronic Health Record (EHR) for a patient. The health data may comprise billing and/or diagnostic codes, notes, and/or other materials. The EHR may be obtained, for example, via an authorized access to a health record system of a health care network that provides care for the patient, such as via an Application Programming Interface (API) other resource. In some cases, such data from the EHR can indicate that a family history of breast cancer exists for the patient (e.g., as indicated by a corresponding predefined code, such as an International Classification of Diseases (ICD) or Current Procedural Terminology (CPT) code, or natural language search of the EHR). This can further include obtaining (or having obtained) a biological sample from the patient, such as a sample of blood or saliva.

Steps 1304 and 1306 include performing (or having performed) sequencing on the biological sample to determine whether the patient is a carrier of qualifying variants in the genes being considered. In one embodiment, each qualifying variant is selected from the group consisting of LoF variants and coding variants.

At step 1304, the BRCA1, BRCA2, PALB2, ATM, and CHEK2 genes can be reviewed for pathogenic single nucleotide variants (SNVs) or copy-number variants (CNVs), such as by methods discussed in detail above. If any of the BRCA1, BRCA2, PALB2, ATM, and CHEK2 genes contain such pathogenic SNVs or CNVs, the patient can be categorized as high risk at block 1310.

However, if no pathogenic SNVs or CNVs are seen in the collective genes, they can be further analyzed for variants of uncertain significance (VUS) at step 1306. If VUS are found, the patient can be categorized as average risk at block 1312.

Steps 1304 and 1306 may be performed via the genomics laboratory and bioinformatics processes discussed above with reference to FIG. 1, or via any suitable sequencing technique. In one embodiment, such a determination is made whenever a qualifying variant is called in a VCF file or similar data structure. In a further embodiment, such a determination is made whenever a qualifying variant has been confirmed by a variant scientist or automated system and indicated in metadata accompanying the sequencing data for the patient. If pathogenic SNVs, pathogenic CNVs, and VUS are not found in the BRCA1, BRCA2, PALB2, ATM, and CHEK2 genes, the information can be further screened for PRS.

In step 1308, the system reviews or calculates a Polygenic Risk Score (PRS) pertaining to the patient. The PRS may be calculated according to any accepted heuristic. In many embodiments, the PRS comprises a weighted sum of values applied to each detected SNP within a set of predefined loci at the genome. For example, a PRS may be calculated according to the techniques described in Mavaddat N, Michailidou K, Dennis J, et al. "Polygenic Risk Scores for Prediction of Breast Cancer and Breast Cancer Subtypes." Am J Hum Genet. 2019; 104(1): 21-34, herein incorporated by reference. In a further example, the PRS comprises an aggregate score based on at least three hundred loci at the genome. For many PRS calculations, a higher PRS is indicative of higher risk.

In one embodiment, PRS is calculated according to the formula below, wherein Bj comprise a per-allele log Odds Ratio (OR) for breast cancer associated with SNP j, xk is the allele dosage for SNP k, and n is the total number of SNPs included in the PRS:

$$PRS = \beta 1x1 + \beta 2x2 + \ldots + \beta jxj \ldots + \beta nxn \qquad (1)$$

In some examples, statistical information (e.g., median, top decile, standard deviation, etc.) for the distribution of PRS across the population is determined by calculation prior to method 1300 (e.g., after a representative portion of a population has been sequenced) as part of an initialization process. As used herein, the population comprises a representative demographic grouping for the patient (e.g., a demographic grouping that the patient belongs to), such as a set of the general population, a set of women in the general population, another representative demographic group, etc. In one embodiment, the population comprises a group of at least one thousand individuals, such as thirty thousand individuals or more.

If the PRS for the patient is in the top 90% for the population, the patient can be categorized as average risk at block 1312. However, if the patient is in the lower 10% of the PRS for the population, the patient can be categorized as low risk at block 1314.

For high risk patients at bock 1310, preventive measures can be done, such as early mammogram screenings. Conversely, for low risk patients at block 1314, a reduced number of preventive measures can be done, such as late mammogram screenings. Average risk patients at block 1312 can maintain an average assessment pattern.

The method of FIG. 13 can be implemented within a system such as the systems depicted and discussed with references to FIGS. 1-2 above. In an example, the method of FIG. 13 can be implemented across user interfaces such as those discussed with references to FIGS. 10-11 above. In an example, the method of FIG. 13 can be implemented on a machine such as the example machine shown and discussed in FIG. 12 above.

Figure 14:
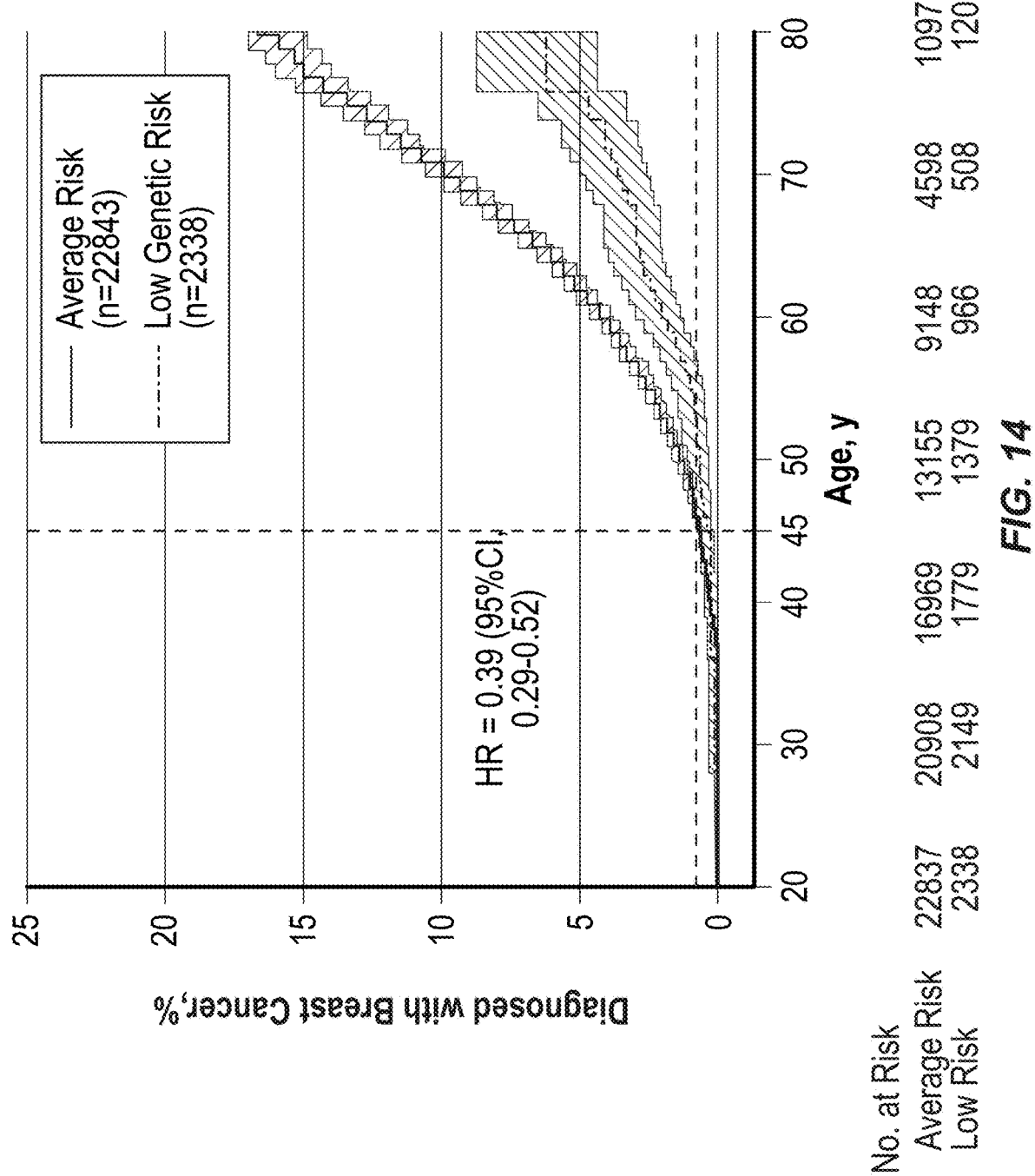
FIG. 14 is a diagram depicting risk stratification for breast cancer in an illustrative embodiment.

An Example implementation of the method shown in FIG. 13 is described below in Example 3, and with results of that illustrative example shown and discussed with reference to FIG. 14.

EXAMPLES

Various embodiments of the present disclosure can be better understood by reference to the following Examples which are offered by way of illustration. The present disclosure is not limited to the Examples given herein.

Example 1. High-Risk Screening Strategy #1

The first two Examples evaluated high-risk screening strategies. Results indicated that although determining the odds ratio for developing breast cancer based on screening results is important, genetic screening in the general population should consider multiple factors. These include the number of individuals testing positive who will require further counseling and surveillance, the number of individuals overlooked by current guidelines, and those diagnosed with breast cancer before the age of 50 who are missed by genetic screening strategies.

A first high-risk screening strategy (strategy #1) discussed in Example 1 involves referring all women with either a family history of breast cancer, a pathogenic variant in BRCA1, BRCA2, or PALB2, or a pathogenic variant in ATM and CHEK2 coupled with a high PRS to a high-risk breast cancer clinic. Strategy #1 corresponds with FIG. 3 above. Both Example 1 and Example 2 arose from the methods described below and corresponding discussion.

Methodology. These discussed methods were used for both Example 1 and Example 2. As of December 2022, 47,179 individuals had consented to and been sequenced as part of the Healthy Nevada Project (HNP). The analysis focused on women with available EHR from Renown Health. In the retrospective study utilized by the following examples, 25,591 women with available electronic health records and genetic data, participants in the Healthy Nevada Project, were studied.

Family history of breast cancer was ascertained on or after the record of breast cancer for 78% of women with both, indicating that this risk assessment method is not being properly utilized for early screening.

This study was based on the HNP. The HNP study was reviewed and approved by the University of Nevada, Reno Institutional Review Board (IRB, project 956068-12), and all participants provided informed consent. This study only included participants who were inferred to be of female sex based on the genetic data and had longitudinal data length >0 in the EHR at Renown Health. Clinical phenotypes from EHR Phenotypes were processed from Epic/Clarity Electronic Health Records (EHR) data.

This study focused on breast cancer and did not look at ovarian cancer despite the known impact of pathogenic variants in BRCA1 and BRCA2 on both breast and ovarian cancers. ICD10-CM codes C50, D05, and Z85.3 were used to identify women diagnosed with breast cancer. The study did not take into account secondary neoplasm of the breast.

Diagnosis codes (ICD-10 codes) were used to identify individuals with family history. For family history of breast cancer, ICD10-CM code Z80.3 was used.

Sequencing. The samples were sequenced at Helix using the Exome+ assay, which includes a clinical exome and the sequencing of SNVs outside of the exome. Data were processed using a custom version of Sentieon and aligned to GRCh38, with variant calling and phasing algorithms following Genome Analysis Toolkit best practices. Imputation of common variants in the HNP data was performed by pre-phasing samples and then imputing. Pre-phasing was performed using reference databases, which include the 1000 Genomes Phase 2 data. This was followed by genotype imputation for all 1000 Genomes Phase 3 sites that have genotype quality values <20.

Variant annotation and classification. The analysis focused on variants in 5 genes: BRCA1, BRCA2, PALB2, ATM, and CHEK2. Sequencing data, variant data, and EHR data associated with the study of these genes are summarized in FIGS. 5-7, discussed above.

The following steps were done to annotate variants and identify loss-of-function variants:

1. Preparation of the genetic file. Genotype processing was performed in Hail. Restrict Hail matrix table to specific genomic intervals for the 5 genes.
2. Annotate with Ensembl Variant Effect Predictor-99 with Clinvar and with gnomAD_v3. The MANE transcripts were used to determine variant consequence. There were 13,853 variants in the 5 genes before any filtering.
3. Filter out variants flagged as "Filtered variants" by gnomAD because they did not pass their quality control process. 13,673 variants remained.
4. Annotation using the following logic:
  a. IF the variant was rs555607708 CHEK2 del1100C variant (ENST00000404276.6: c.1100del) THEN label as "P/LP."
  b. ELSE IF the variant was reviewed by the Clingen expert panel (CLNREVSTAT field in Clinvar table) THEN keep the interpretation from the Clingen expert panel.
  c. ELSE IF the variant had criteria provided by multiple submitters with no conflicts (CLNREVSTAT field in Clinvar table) and was "Benign" or "Likely Benign" (CLNSIG field) THEN label as "B/LB."
  d. ELSE IF the variant had criteria provided by multiple submitters with no conflicts (CLNREVSTAT field in Clinvar table) and was "Uncertain significance" (CLNSIG field) THEN label as "VUS."
  e. ELSE IF the variant was called as LOF with High Confidence by LOFTEE,25 THEN label "P/LP."
  f. ELSE label variant as "not pathogenic."
5. A total of 184 variants were called "P/LP" this way.
6. Additional quality control was done for each of these variants, including review of the DP, AD, GQ fields, the allele frequency in our cohort and in other databases, and visualization of the BAM file with IGV for small insertions or deletions.
7. Two variants in the same gene and same individual were removed as likely false positives after reviewing the BAM file. A total of 182 variants were annotated as pathogenic variants for this study.

This study utilized databases such as Clinvar.

The Helix Exome+ assay includes a copy-number variant (CNV) caller, allowing us to incorporate rare CNVs at exon level resolution. CNVs with the PASS QC filter were annotated with overlapping MANE transcripts. Only large deletions were considered to be pathogenic for this Example.

PRS calculation. The PRS model selected is the 313 SNVs PRS published in 2019.14 It is also available in the PGS catalog26 The coordinates and effect size of each alternate allele were converted from human reference genome GRCh37 to the more recent GRCh38. 300 SNVs out of the 313 were used to ensure strong overall callability for each SNV used and confidence that the alternate (and effect) allele was correct. Allele frequencies of alternative alleles matched closely with published allele frequencies for these variants.

A score was calculated for each of the 25,591 women included in the study. The distribution of genetic similarity was the following: N Africa=499, N Americas=3,728, N East Asia=832, N Europe=19,484, N Other=929, and N South Asia=119. Briefly, a genotype dosage was calculated for each variant in the score for each individual.

The dosage was based on the genotype probability field resulting from the imputation pipeline. When an individual had no GP or no GT (genotype) for a specific variant, the dosage was based on the allele frequency of this variant in gnomAD v3 for the population closest to the genetic similarity of the participant. The cohort was split into 6 cohorts based on genetic similarity and ranked individuals based on their PRS value and assigned a percentile based on the ranking within the participant's genetic similarity distribution. Lastly, all 6 genetic similarity groups were regrouped into 1 cohort for later analyses that were based on percentiles.

Cancer risk thresholds. The National Comprehensive Cancer Network (NCCN) guidelines consider "Increased risk" in asymptomatic women with a residual lifetime risk ≥20% as defined by models that are largely based on family history. Here, the NCCN definition was followed. The Example considered a woman to be at increased risk or high risk if they had an accumulated risk of being diagnosed with breast cancer ≥20% by age 70.

Survival analysis, hazard ratios, and statistical tests. A variety of statistical tests and analyses were used. Kaplan Meier survival curves were done using the KaplanMeierFitter function from the Lifelines python library. Statistical differences between survival curves were assessed using a logrank_test function from the lifelines. statistics python library. Values at a given age (e.g., 70 years old) were calculated using the "predict" function. Hazard ratios were calculated using the CoxPHFitter function from the Lifelines python library. Plots were made using pyplot from the matplotlib python library.

Genetic screening evaluation. Positive Predictive Value (PPV) was calculated as: (% of Positives that were diagnosed with breast cancer by age 70 based on the KM curve):

$$\text{Specificity} = TN/(TN + FP).$$

Here, true negatives (TN) were defined as those who were put in the "average risk group" based on genetic screening and with no breast cancer diagnosis by age 70. False positives (FP) are defined as those who were put in the "high risk group" and who did not have a breast cancer diagnosis by age 70.

Number Needed to Screen (NNS) was also calculated. NNS was defined as the number of women who must be enrolled in our population genetic screening program to prevent 1 adverse outcome. Here, the study defined preventable adverse outcome a diagnosis of breast cancer before age 50.

NNS_strat=1/(fraction with genetic high risk×fraction of those with a breast cancer diagnosis by age 50)

A validated PRS of 313 SNVs was used. The median breast cancer PRS showed variation based on genetic similarity. When comparing breast cancer cases and controls, the distributions of the PRS were shifted, and the PRS achieved an area under the curve (AUC) of 0.63 in participants in the Europe genetic similarity group and 0.66 in participants in the Americas genetic similarity group.

To enable the study of all participants and to better emulate a real-world scenario in which all participants would receive a result, a PRS percentile was assigned to each participant based on their rank within their genetic similarity group. The study then combined all the participants and assessed the impact of being in the top or bottom of their group specific PRS distribution. Furthermore, it excluded all participants having a pathogenic variant in 1 of the 5 genes previously studied, namely, BRCA1, BRCA2, PALB2, ATM, and CHEK2, to ensure that these variants would not confound the results.

Results. Overall, in both Example 1 and Example 2, the variant calls for the genes of interest (BRCA1, BRCA2, PALB2, ATM, and CHEK2) in both Examples were of high quality, and all variants annotated as pathogenic had an allele frequency below 0.1% in the population, except for the CHEK2 del1100C variant. In total, 410 (1.6%) women were identified who had a heterozygous pathogenic variant in 1 of these 5 genes. No individual had a homozygous pathogenic variant or a copy number of 0 in these genes. One individual had 2 heterozygous pathogenic variants in different genes (1 in BRCA1 and 1 in BRCA2).

The risk of breast cancer was highest for women with a pathogenic variant in BRCA1 or BRCA2: hazard ratio (HR) of 16.2 (95% CI: 10.9-24.1, P=2.6e-76) for BRCA1 and HR=8.5 (CI: 5.8-12.5, P=1.3e-39) for BRCA2. The next-highest risk was for women having a pathogenic variant in PALB2, with a HR of 6.3 (95% CI: 3.4-11.7, P=3.2e-11), followed by ATM, with a HR of 4.3 (95% CI: 2.6-7.2, P=1.0e-09), and finally CHEK2, with a HR of 2.6 (95% CI: 1.7-4.2, P=2.4e-05). The calculated risk stratification is shown and discussed with reference to FIGS. 8-9 above.

The probability of diagnosis at age 70 was 9.3% for women without a pathogenic variant, 76% for women with a BRCA1 pathogenic variant, 55% for those with a BRCA2 pathogenic variant, 36% for those with a PALB2 pathogenic variant, 37% for those with an ATM pathogenic variant, and 19% for those with a CHEK2 pathogenic variant. This analysis revealed that some individuals with a pathogenic variant in PALB2 were diagnosed with breast cancer well before the age of 50 and had a similar risk to those with a BRCA2 variant before the age of 50.

Additionally, both Example 1 and Example 2 illustrated that high polygenic risk significantly increases risk of breast cancer but less so than monogenic risk. The clinical impact of having a high polygenic risk for breast cancer was evaluated, which quantifies the contribution of common variants known to be associated with this disease.

Women in the top 2% and top 10% of their group specific PRS distribution exhibited an increased risk of breast cancer compared with women with an average polygenic risk, with HR of 3.1 and 2.4, respectively. Both of these risks were lower compared with the risk associated with having a pathogenic variant in BRCA1, BRCA2, or PALB2 (HR=10.4, CI: 8.1-13.5) but were closer to the risk associated with having a pathogenic variant in ATM or CHEK2 (HR=3.4, CI: 2.4-4.8). For women with a PRS in the top 2% and top 10% of their group specific distribution and without a pathogenic variant, the probability of diagnosis at age 70 was 26% and 20%, respectively.

The study determined that polygenic risk could modify monogenic risk for genes of intermediate penetrance: ATM and CHEK2.

The calculations for Example 1 are summarized below:

$$PPV\_strat1 = 34\%$$

Specificity_strat1 =

$$23{,}593 \times (1 - 0.076)/(23{,}593 \times (1 - 0.076) + 1998 \times 0.66) =$$

$$21{,}800/(21{,}800 + 1319) = 21{,}800/23{,}119 = 94.3\%$$

NNS_strat1 =

$$1/(1998/25{,}591 \times 0.070) = 1/(0.078 \times 0.070) = 1/0.00547 = 183.$$

To improve statistical power and avoid overly small subgroups, the cohort was partitioned into 2 groups based on PRS. The HR of women in the top 50% of the PRS compared with those in the bottom 50% of the PRS was 2.1. Although most combinations of polygenic risk with monogenic risk, polygenic risk with family history, or family history with monogenic risk enhanced risk stratification, 1 combination—PRS and pLOF in ATM or CHEK2—appeared particularly useful clinically. This was because individuals in the higher-risk group were clearly above the 20% risk at age 70, a threshold that defines women at high risk, whereas the lower-risk group was clearly below this threshold.

The probability of breast cancer diagnosis at age 70 in individuals with a pathogenic variant in ATM of CHEK2 and in the top 50% of the PRS distribution was 39.2%, whereas those in the bottom 50% of the PRS distribution had a risk of only 14.4%.

Individuals with a pathogenic variant in BRCA1, BRCA2, or PALB2 had a risk of breast cancer well above 20% at age 70, regardless of their PRS or family history.

In Example 1, 7.8% of women were identified as high risk based on possessing a predicted loss-of-function (PLOF) variant in BRCA1, BRCA2, or PALB2, or a pLOF variant in ATM or CHEK2 combined with being in the top 50% of the polygenic risk score (PRS) distribution. Results indicated 1,998 women out of the study population were in the high risk category.

Example 2. High-Risk Screening Strategy #2

In Example 2, the same methodologies were applied as those discussed above with reference to Example 1. Here, an alternative high-risk screening strategy (strategy #2) discussed in Example 2 entails discontinuing the ascertainment of family history of breast cancer and instead referring all women with a pathogenic variant in BRCA1, BRCA2, PALB2, ATM, or CHEK2 or a PRS in the top 10%. Strategy #2 corresponds with FIG. 4 above. Both Example 1 and Example 2 arose from the discussion provide below and shared the methods described above.

The calculations in Example 2 are summarized below:

$$PPV\_strat2 = 23\%$$

Specificity_strat2 =

$$22{,}682 \times (1 - 0.081)/(22{,}682 \times (1 - 0.081) + 2909 \times 0.77) =$$

$$20{,}845/(20{,}845 + 2240) = 20{,}845/23{,}085 = 90.3\%$$

NNS_strat2 =

$$1/(2909/25{,}591 \times 0.041) = 1/(0.114 \times 0.041) = 1/0.0047 = 213.$$

Results. For both Example 1 and Example 2, women in the top 2% and top 10% of their group specific PRS distribution exhibited an increased risk of breast cancer compared with women with an average polygenic risk, with HR of 3.1 and 2.4, respectively. Both of these risks were lower compared with the risk associated with having a pathogenic variant in BRCA1, BRCA2, or PALB2 (HR=10.4, CI: 8.1-13.5) but were closer to the risk associated with having a pathogenic variant in ATM or CHEK2 (HR=3.4, CI: 2.4-4.8). For women with a PRS in the top 2% and top 10% of their group specific distribution and without a pathogenic variant, the probability of diagnosis at age 70 was 26% and 20%, respectively.

The study determined that polygenic risk could modify monogenic risk for genes of intermediate penetrance: ATM and CHEK2.

In Example 2, 11.4% of women were identified as high risk based on possessing a predicted loss-of-function (PLOF) variant in BRCA1, BRCA2, PALB2, ATM, or CHEK2, or being in the top 10% of the polygenic risk score (PRS) distribution. Results indicated 2,909 women out of the study population were in the high risk category.

Example 3. Identification of Low Risk Patients

In Example 3, breast cancer incidence and age of onset among women at low genetic risk compared with women at average risk was assessed according to the method of FIG. 13. The potential to delay mammography on the basis of genetic risk stratification was evaluated. This retrospective case-control study included the 25,591 women from the Healthy Nevada Project sequenced between 2018 and 2022.

Methodology. This retrospective analysis of 25,591 women was conducted with data from the Healthy Nevada Project who had available electronic health records from Renown Health. (The University of Nevada, Reno, project 956068-12). All participants provided written informed consent between 2018 and 2022. Breast cancer diagnoses were determined from electronic health records using the International Statistical Classification of Diseases (Tenth Revision, Clinical Modification (ICD-10-CM) codes C50, D05, and Z85.3.) Of the total participants, 1,295 women (5.1%) had a diagnosis of breast cancer at the end of 2022.

Genetic data for these patients was obtained through the Helix Exome assay, which combines clinical-grade exome sequencing with a microarray-equivalent backbone sequencing, enabling imputation of common SNVs for PRS calculation. Participants were assigned a PRS percentile based on their rank within the genetic similarity group, ensuring no exclusion due to genetically inferred ancestry.

The initial intake and evaluation of patient data was done in accordance with the methods discussed above with Example 1.

Results. Of 25,591 women in the study, 410 (1.6%) were classified as high risk with a pathogenic ("P") variant in BRCA1, BRCA2, PALB2, ATM, or CHEK2. An additional 1,967 women had a variant of uncertain significance (VUS) in these genes. Women with a P variant had a significantly increased risk compared with those without a P variant or a VUS. However, women with a VUS had no increased risk. Although these results showed that most VUS had no significant association with disease risk, historical data from ClinVar have shown that some VUS are reclassified as pathogenic. Therefore, women with a VUS were excluded from the low-risk group.

Next, the 313-SNVs polygenic risk score (PRS) was associated with breast cancer diagnosis in the study cohort. Women in the bottom 10% of the PRS distribution had a decreased risk of breast cancer compared with those with an average PRS (between 41% and 60%; HR, 0.48; 95% CI, 0.36-0.65; P<0.001). Overall, 410 women (1.6%) were classified as high risk (e.g., with presence of a P variant), 22,843 women (89.3%) as average risk, and 2,338 women (9.1%) as low risk (e.g., no P or VUS variant and a PRS in the bottom 10%). There were significantly fewer breast cancer diagnoses in the low risk category compared with those at average risk.

To assess the potential to defer screening, the cumulative risk of breast cancer was calculated at 5 and 10 years after the recommended start of biennial mammography. By the age of 45 years (5 years after the recommended age to start mammogram screening), 0.69% of women at average risk had been diagnosed with breast cancer, a rate not reached by women in the low-risk group until the age of 51 years, summarized in FIG. 14 and the Table below:

PRS is useful to define a lower-risk group because rare variants were only present in less than 10% of individuals. For example, of 25,591 women, 410 had a P variant (1.6%), and 1,967 had a VUS (7.7%). Rare variants alone cannot separate those with average risk from those with lower risk. These results indicate that women at low genetic risk have a similar risk of breast cancer at age 51 years as those at average risk at age 45 years, and a similar risk at age 58 years as those at average risk at age 50 years.

Based on the US Census Bureau there are approximately 14 million women in the US aged 40 to 47 years, indicating that approximately 1.3 million women would be at low risk using the genetic approach discussed herein. This could potentially avoid 650,000 mammograms each year. This underscores the value of genetics in reducing over-screening, associated overdiagnosis, costs, and anxiety by identifying patients at low risk of breast cancer who may be able to defer mammogram screening to later in life. Implementing recommendations to decrease screening based on low-risk factors may pose challenges for physicians, but reliable risk assessment is essential to support informed decisions and build patient trust in both high-risk and low-risk scenarios. Using a validated genetic risk stratification tool could

TABLE

Cumulative Risk of Breast Cancer Diagnosis at Different Ages from Example 3.
Cumulative Risk of Breast Cancer Diagnosis at Different Ages

| Variable | Genetic risk group, No. (%) | | Hazard Ratio (95% Cl) |
|---|---|---|---|
| | Average | Low | |
| No. | 22843 (89.3) | 2338 (9.1) | NA |
| With breast cancer by age 35 y | 17 (0.08) | 1 (0.04) | 0.57 (0.08-4.30) |
| With breast cancer by age 40 y | 55 (0.30) | 3 (0.15) | 0.66 (0.21-2.10) |
| With breast cancer by age 45 y | 117 (0.69) | 7 (0.40) | 0.53 (0.25-1.13) |
| With breast cancer by age 50 y | 218 (1.41) | 10 (0.60) | 0.48 (0.26-0.91) |
| With breast cancer by age 55 y | 365 (2.62) | 15 (0.99) | 0.40 (0.24-0.66) |
| With breast cancer by age 60 y | 537 (4.30) | 26 (2.03) | 0.47 (0.32-0.70) |
| With breast cancer by age 65 y | 735 (6.70) | 34 (2.95) | 0.46 (0.32-0.64) |
| With breast cancer by age 70 y | 929 (9.90) | 38 (3.65) | 0.40 (0.29-0.55) |

Also tested was whether expanding the number of genes analyzed would detect any of the 10 women in the low-risk group diagnosed with breast cancer by age 50. Whether any of the 10 women in the low-risk group diagnosed with breast cancer by age 50 years were detected was tested by expanding the number of genes analyzed. However, only 48 women of 25,591 (0.2%) had a P variant in 1 of these 6 additional genes (BARD1, CDH1, MAP3K1, RAD51C, RAD51D, or TP53). A total of 38 women in the previously defined low-risk group were reclassified: 4 carried a P variant and 34 a VUS in the BARD1, CDH1, MAP3K1, RAD51C, RAD51D, or TP53 gene, none of whom were diagnosed with breast cancer at the time of this study. Overall, the results remained unchanged, indicating that deferring mammogram screening by 5 to 10 years for women in the low-risk group would lead to a similar screening performance compared with the current USPSTF guidelines.

It appears that current screening guidelines do not adequately account for interindividual variability in breast cancer risk, and when they aim to account for interindividual variability, they specifically focus on identifying those at higher risk. The findings of this retrospective case-control study suggest that rare and common variants can also be combined to identify women at lower risk of breast cancer. These findings also validate this stratification in a large, unselected cohort that measured breast cancer incidence.

reduce guideline discrepancy and improve clinician efficacy in shared decision-making discussions regarding individualized screening plans.

Additional Examples

The following example embodiments are provided, the numbering of which is not to be construed as designating levels of importance:

In some aspects, the techniques described herein relate to a method of determining breast cancer risk level for a patient, the method including: analyzing sequenced genetic data originating from the patient to determine whether the patient has a qualifying variant in any of genes BRCA1, BRCA2, PALB2, ATM, and CHEK2, wherein the qualifying variant can include one or more pathogenic variants, variants of uncertain significance (VUS), or combinations thereof; and in an event that the patient does not have a qualifying variant in any of genes BRCA1, BRCA2, PALB2, ATM, and CHEK2, calculating a polygenic risk score (PRS) of the patient; and if the patient has a PRS lower than a predetermined threshold, classifying the patient as low risk for breast cancer.

In some aspects, the techniques described herein relate to a method, wherein in an event that the patient has a qualifying variant in any of genes BRCA1, BRCA2, PALB2, ATM, and CHEK2, and the qualifying variant is one or more pathogenic variants, classifying the patient as high risk for breast cancer and referring the patient for preventive measures pertaining to breast cancer.

In some aspects, the techniques described herein relate to a method, wherein the qualifying variant includes a pathogenic single nucleotide variant or a pathogenic copy number variant.

In some aspects, the techniques described herein relate to a method, wherein in an event that the patient has a qualifying variant in any of genes BRCA1, BRCA2, PALB2, ATM, and CHEK2, and the qualifying variant is a VUS variant but not a pathogenic variant, classifying the patient as average risk for breast cancer, thereby excluding the patient from being classified as low-risk.

In some aspects, the techniques described herein relate to a method, wherein if the patient has a PRS above the predetermined threshold, classifying the patient as average risk for breast cancer, thereby excluding the patient from being classified as low-risk.

In some aspects, the techniques described herein relate to a method, further including obtaining or having obtained a biological sample from the patient and performing or having performed sequencing on the biological sample to acquire genetic data for the patient.

In some aspects, the techniques described herein relate to a method, further including receiving health data for the patient indicating whether the patient is female, and if the patient is not female, foregoing performing the method for male patients.

In some aspects, the techniques described herein relate to a method, further including receiving health data for the patient indicating whether the patient has a family history of breast cancer.

In some aspects, the techniques described herein relate to a method wherein the PRS includes an aggregate score based on at least three hundred loci.

In some aspects, the techniques described herein relate to a method wherein the PRS includes a weighted sum of values applied to each detected Single Nucleotide Polymorphism (SNP) within a set of predefined loci at a genome.

In some aspects, the techniques described herein relate to a method of determining breast cancer risk level for a patient, the method including: receiving health data indicating whether a patient that is female has a family history of breast cancer; obtaining or having obtained a biological sample from the patient; performing or having performed sequencing on the biological sample to acquire genetic data for the patient; analyzing the genetic data to determine whether the patient has a qualifying variant in any of genes ATM or CHEK2; and in an event that the patient has a qualifying variant in any of genes ATM or CHEK2: calculating a Polygenic Risk Score (PRS) for the patient; if the patient has a PRS higher than a first threshold, referring the patient for preventive measures pertaining to breast cancer.

In some aspects, the techniques described herein relate to a method, wherein the qualifying variants include Loss of Function (LoF) and coding variants.

In some aspects, the techniques described herein relate to a method, wherein the PRS includes an aggregate score based on at least three hundred loci.

In some aspects, the techniques described herein relate to a method, wherein the PRS includes a weighted sum of values applied to each detected Single Nucleotide Polymorphism (SNP) within a set of predefined loci at a genome.

In some aspects, the techniques described herein relate to a method, wherein the first threshold is a median score for a population that the patient belongs to.

In some aspects, the techniques described herein relate to a method, wherein the health data indicates the family history of breast cancer via a predefined code.

In some aspects, the techniques described herein relate to a method, further including, prior to analyzing the genetic data to determine whether the patient has a qualifying variant in any of genes ATM or CHEK2, analyzing the genetic data to determine whether the patient has a qualifying variant in any of genes BRCA1, BRCA2, or PALB2 wherein qualifying variants are selected from the group consisting of Loss of Function (LoF) variants and coding variants; and in an event that the patient has a qualifying variant in any of genes BRCA1, BRCA2, or PALB2, referring the patient for preventive measures pertaining to breast cancer.

In some aspects, the techniques described herein relate to a method, further including, prior to analyzing the genetic data to determine whether the patient has a qualifying variant in any of genes ATM or CHEK2, analyzing the genetic data to determine whether the patient has a qualifying variant in a gene BRCA1, wherein qualifying variants are selected from the group consisting of Loss of Function (LoF) variants and coding variants; analyzing the genetic data to determine whether the patient has a qualifying variant in a gene BRCA2; analyzing the genetic data to determine whether the patient has a qualifying variant in a gene PALB2; and in an event that the patient has any of a qualifying variant in the gene BRCA1, a qualifying variant in the gene BRCA2, a qualifying variant in the gene PALB2, a qualifying variant in the gene ATM and a PRS higher than a median PRS for the population, or a qualifying variant in the gene CHEK2 and a PRS higher than the median PRS for the population: referring the patient for preventive measures pertaining to breast cancer.

In some aspects, the techniques described herein relate to a method, wherein receiving health data including obtaining or having obtained health data from an Electronic Health Record (EHR) for a patient that is female and inspecting the health data to determine whether the patient has a family history of breast cancer.

In some aspects, the techniques described herein relate to a method of determining breast cancer risk level for a patient, the method including: receiving health data indicating whether a patient that is female has a family history of breast cancer; obtaining or having obtained a biological sample from the patient; performing or having performed sequencing on the biological sample to acquire genetic data for the patient; analyzing the genetic data to determine whether, regardless of family history, the patient has a qualifying variant in any of genes BRCA1, BRCA2, PALB2, ATM, or CHEK2; and in an event that the patient has a qualifying variant in any of genes BRCA1, BRCA2, PALB2, ATM, or CHEK2: referring the patient for preventive measures pertaining to breast cancer.

Each of these non-limiting examples can stand on its own or can be combined in various permutations or combinations with one or more of the other examples.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of determining breast cancer risk level for a patient, the method comprising:

obtaining or having obtained a biological sample from the patient and performing or having performed sequencing on the biological sample to acquire sequenced genetic data for the patient, wherein the sequenced genetic data is accessible via a memory of a genomics server according to at least one file format selected from the group consisting of: a FASTQ format, a browser extensible data (BED) format, a binary alignment map format (BAM), a compressed reference oriented alignment map (CRAM) format, and a variant call format (VCF);

analyzing, by the genomics server, genes BRCA1, BRCA2, PALB2, ATM, and CHEK2 represented in the sequenced genetic data;

determining, by the genomics server, that the patient does not have a qualifying variant in the analyzed genes BRCA1, BRCA2, PALB2, ATM, and CHEK2, wherein the qualifying variant includes at least one of a pathogenic variant, or a variant of uncertain significance (VUS), wherein a memory of the genomics server stores indications of variants included in the analyzed genes, and wherein a memory of the genomics server stores a location of the sequenced genetic data;

in response to determining that the patient does not have a qualifying variant in any of genes BRCA1, BRCA2, PALB2, ATM, and CHEK2, calculating, by the genomics server, a polygenic risk score (PRS) of the patient by analyzing the sequenced genetic data to determine a presence or absence of single nucleotide polymorphisms (SNPs) indicating breast cancer susceptibility that are located at predefined locations within a human genome; and based on a comparison of the PRS to a predetermined threshold, classifying, by the genomics server, the patient as low risk for breast cancer.

2. The method of claim 1, wherein in an event that the patient has a qualifying variant in any of genes BRCA1, BRCA2, PALB2, ATM, and CHEK2, and the qualifying variant is one or more pathogenic variants, classifying the patient as high risk for breast cancer and referring the patient for preventive measures pertaining to breast cancer.

3. The method of claim 2, wherein the qualifying variant comprises a pathogenic single nucleotide variant or a pathogenic copy number variant.

4. The method of claim 1, wherein in an event that the patient has a qualifying variant in any of genes BRCA1, BRCA2, PALB2, ATM, and CHEK2, and the qualifying variant is a VUS variant but not a pathogenic variant, classifying the patient as average risk for breast cancer, thereby excluding the patient from being classified as low-risk.

5. The method of claim 1, wherein if the patient has a PRS above the predetermined threshold, classifying the patient as average risk for breast cancer, thereby excluding the patient from being classified as low-risk.

6. The method of claim 1, wherein the genes BRCA1, BRCA2, PALB2, ATM, and CHEK2 are analyzed with respect to qualifying variant criteria indicating at least one of one or more Polyphen values or one or more Sorting Intolerant From Tolerant (SIFT) values to classify a variant as a qualifying variant.

7. The method of claim 1, further comprising receiving health data for the patient indicating whether the patient is female, and if the patient is not female, foregoing performing the method for male patients.

8. The method of claim 1, further comprising receiving health data for the patient indicating whether the patient has a family history of breast cancer.

9. The method of claim 1 wherein the PRS comprises an aggregate score based on at least three hundred loci.

10. The method of claim 1 wherein the PRS comprises a weighted sum of values applied to each detected Single Nucleotide Polymorphism (SNP) within a set of predefined loci at the human genome.

11. The method of determining breast cancer risk level for a patient, the method comprising:
   receiving health data indicating whether a patient that is female has a family history of breast cancer;
   obtaining or having obtained a biological sample from the patient;
   performing or having performed sequencing on the biological sample to acquire sequenced genetic data for the patient, wherein the sequenced genetic data is accessible via a memory of a genomics server according to at least one file format selected from the group consisting of: a FASTQ format, a browser extensible data (BED) format, a binary alignment map format (BAM), a compressed reference oriented alignment map (CRAM) format, and a variant call format (VCF);
   analyzing, by the genomics server, the sequenced genetic data to determine whether the patient has a qualifying variant in any of genes ATM or CHEK2, wherein qualifying variants are selected from the group consisting of Loss of Function (LoF) and coding variants, wherein a memory of the genomics server stores indications of variants included a number of analyzed genes, and wherein a memory of the genomics server stores a location of the sequenced genetic data; and
   in an event that the patient has a qualifying variant in any of genes ATM or CHEK2:
   calculating, by the genomics server, a Polygenic Risk Score (PRS) for the patient by analyzing the sequenced genetic data to determine a presence or absence of single nucleotide polymorphisms (SNPs) indicating breast cancer susceptibility that are located at predefined locations within a human genome; and
   if the patient has a PRS higher than a first threshold, referring the patient for preventive measures pertaining to breast cancer.

12. The method of claim 11, wherein the qualifying variants comprise Loss of Function (LoF) and coding variants.

13. The method of claim 11, wherein the PRS comprises an aggregate score based on at least three hundred loci.

14. The method of claim 11, wherein the PRS comprises a weighted sum of values applied to each detected Single Nucleotide Polymorphism (SNP) within a set of predefined loci at the human genome.

15. The method of claim 11, wherein the first threshold is a median score for a population that the patient belongs to.

16. The method of claim 11, wherein the health data indicates the family history of breast cancer via a predefined code.

17. The method of claim 11, further comprising, prior to analyzing the sequenced genetic data to determine whether the patient has a qualifying variant in any of genes ATM or CHEK2,
   analyzing the sequenced genetic data to determine whether the patient has a qualifying variant in any of genes BRCA1, BRCA2, or PALB2 wherein qualifying variants are selected from the group consisting of Loss of Function (LoF) variants and coding variants; and
   in an event that the patient has a qualifying variant in any of genes BRCA1, BRCA2, or PALB2, referring the patient for preventive measures pertaining to breast cancer.

18. The method of claim 11, further comprising, prior to analyzing the sequenced genetic data to determine whether the patient has a qualifying variant in any of genes ATM or CHEK2,
   analyzing the sequenced genetic data to determine whether the patient has a qualifying variant in a gene BRCA1, wherein qualifying variants are selected from the group consisting of Loss of Function (LoF) variants and coding variants;
   analyzing the sequenced genetic data to determine whether the patient has a qualifying variant in a gene BRCA2;
   analyzing the sequenced genetic data to determine whether the patient has a qualifying variant in a gene PALB2; and
   in an event that the patient has any of a qualifying variant in the gene BRCA1, a qualifying variant in the gene BRCA2, a qualifying variant in the gene PALB2, a qualifying variant in the gene ATM and a PRS higher than a median PRS for a population that the patient belongs to, or a qualifying variant in the gene CHEK2 and a PRS higher than the median PRS for the population:
   referring the patient for preventive measures pertaining to breast cancer.

19. The method of claim 11, wherein receiving health data comprising obtaining or having obtained health data from an Electronic Health Record (EHR) for a patient that is female and inspecting the health data to determine whether the patient has a family history of breast cancer.

20. A method of determining breast cancer risk level for a patient, the method comprising:
   receiving health data indicating whether a patient that is female has a family history of breast cancer;
   obtaining or having obtained a biological sample from the patient;
   performing or having performed sequencing on the biological sample to acquire sequenced genetic data for the patient, wherein the sequenced genetic data is accessible via a memory of a genomics server according to at least one file format selected from the group consisting of: a FASTQ format, a browser extensible data (BED) format, a binary alignment map format (BAM), a compressed reference oriented alignment map (CRAM) format, and a variant call format (VCF);

retrieving, by a genomics server, qualifying variant criteria from memory of one or more computing devices, the qualifying variant criteria indicating at least one of one or more Polyphen values or one or more Sorting Intolerant From Tolerant (SIFT) values to classify a variant as a qualifying variant;

analyzing, by the genomics server, the sequenced genetic data with respect to the qualifying variant criteria to determine that, regardless of family history, the patient has a qualifying variant in any of genes BRCA1, BRCA2, PALB2, ATM, and CHEK2, wherein a memory of the genomics server stores indications of variants included a number of analyzed genes, and wherein a memory of the genomics server stores a location of the sequenced genetic data; and in an event that the patient has a qualifying variant in any of genes BRCA1, BRCA2, PALB2, ATM, or CHEK2: referring the patient for preventive measures pertaining to breast cancer.

* * * * *